US012572619B2

(12) United States Patent
George et al.

(10) Patent No.: US 12,572,619 B2
(45) Date of Patent: Mar. 10, 2026

(54) MATRIX PROCESSING ENGINE WITH COUPLED DENSE AND SCALAR COMPUTE

(71) Applicant: INTEL CORPORATION, Santa Clara, CA (US)

(72) Inventors: Biji George, Bangalore (IN); Sreenivas Subramoney, Bangalore (IN); Om Ji Omer, Bangalore (IN); Anoop Viswam, Kerala (IN)

(73) Assignee: Intel Corporation, Santa Clara, CA (US)

( * ) Notice: Subject to any disclaimer, the term of this patent is extended or adjusted under 35 U.S.C. 154(b) by 928 days.

(21) Appl. No.: 17/560,100

(22) Filed: Dec. 22, 2021

(65) Prior Publication Data

US 2022/0114234 A1 Apr. 14, 2022

(30) Foreign Application Priority Data

Oct. 29, 2021 (IN) .............................. 202141049577

(51) Int. Cl.
*G06F 17/16* (2006.01)
*G06F 7/544* (2006.01)
(52) U.S. Cl.
CPC ............ *G06F 17/16* (2013.01); *G06F 7/5443* (2013.01)
(58) Field of Classification Search
CPC ...... G06F 9/3877; G06F 17/16; G06F 7/5443; G06F 17/10
See application file for complete search history.

(56) References Cited

U.S. PATENT DOCUMENTS

| | | | |
|---|---|---|---|
| 7,032,038 B1* | 4/2006 | Squires | G06F 30/30 710/72 |
| 2018/0293698 A1* | 10/2018 | Venkatesh | G06T 1/20 |
| 2020/0226203 A1 | 7/2020 | George et al. | |
| 2022/0075842 A1* | 3/2022 | Bhaskaracharya | G06F 17/16 |
| 2024/0078285 A1* | 3/2024 | Baum | G06F 9/3802 |

OTHER PUBLICATIONS

J. Emer, "Multithreading Architectures," Computer Science and Artificial Intelligence Laboratory MIT. (Year: 2005).*
Nvidia, "Nvidia Tesla GPU Computing Solutions for HPC," 2007. (Year: 2007).*
E. Lindholm et al., "Nvidia Tesla: A Unified Graphics and Computing Architecture," 2008. (Year: 2008).*
Nvidia, "Nvidia Tesla V100 GPU Architecture," 2017. (Year: 2017).*
Z. Chen, "Scalar-Vector GPU Architectures," The Department of Electrical and Computer Engineering Northeastern University, 2016. (Year: 2016).*

* cited by examiner

*Primary Examiner* — Matthew D Sandifer
*Assistant Examiner* — Maria De Jesus Rivera
(74) *Attorney, Agent, or Firm* — Akona IP PC

(57) ABSTRACT
A matrix processing engine is provided for efficient matrix computation performed by a dense matrix compute circuit (performing SIMD operations) and a scalar computing core (performing SISD operations). These two processing components operate together to produce output data tiles by feeding results of the dense SIMD operations to the scalar computing core using thread packing and an in-line buffer for accumulating and packing the dense result data. This permits the scalar computing to spawn threads to operate on the dense results as available and without requiring partial or intermediate data read/writes between the dense and scalar computations.

25 Claims, 14 Drawing Sheets

| 32bits Instruction | Instruction Field | Description |
|---|---|---|
| INSTN [4:0] | opcode [4:0] | Supported operations |
| INSTN [10:5] | dest_address [5:0] | Destination address |
| INSTN [11] | dest_clear | Clear destination lock |
| INSTN [17:12] | s0_address [5:0] | Source address of operand0 |
| INSTN [18] | s0_clear | Clear s0 register lock after read |
| INSTN [24:19] | s1_address [5:0] | Source address of operand1 |
| INSTN [25] | s1_clear | Clear s1 register lock after read |
| INSTN [26] | forkToMem | Fork the results to memory |
| INSTN [29:27] | ipPitch [2:0] | Instructions from IP Pointer |
| INSTN [30] | EOI | End of Opcode of this type |
| INSTN [31] | EOT | End of Thread |

| 256bits Instruction | Instruction Field | Description |
|---|---|---|
| INSTN [4:0] | opcode [4:0] | Supported operations |
| INSTN [26:5] | Reserved | Reserved |
| INSTN [29:27] | ipPitch [2:0] | 32bit word count of instruction |
| INSTN [30] | EOI | End of Opcode of this type |
| INSTN [31] | EOT | End of Thread |
| INSTN [256:32] | INSTRN DATA | Instruction's Data field |

Cholesky Decomposition $$L_{i,j} = \frac{1}{L_{jj}}\left(A_{i,j} - \sum_{k=1}^{j-1} L_{i,k}L_{j,k}\right) \text{ for } i > j, \quad L_{jj} = \sqrt{A_{jj} - \sum_{k=1}^{j-1} L_{jk}^2}$$

where L is a lower triangular matrix and A is input matrix

Cholesky Tiling Algorithm

```
; Cholesky Dimension, CD
; Tiles Horizontal & Vertical Coordinate, H = 0,V = 0
; Diagonal Tile Count, DTC = 0
; Lij Cholesky Result, Ais Cholesky Input Matrix
; Horizontal Tile Offset,HTO = 0
; 8 parallel channels in SIMD vector path, 4 MAC per Channel Hmax = CD/8 ; Vmax = CD/8 ;

func Schedule_CHL (V, H)
  N = (H – 1) * 8;
  Acc[7:0][7:0] = 0;
  for X:0 → N/4 {
    for Y: V → V + 8 {
      Ai = L[y][((X + 1) * 4) – 1:X * 4];
      Bi = L[7 + H:H][((X + 1) * 4) – 1:X * 4];
      ; Perform MAC Operation on (Ai, Bi)
      Acc[y][7:0] = Acc[y][7:0] + MAC(Ai,Bi)
    }endfor
  }endfor
  RmemAin[7:0][7 + H:H] → R0[7:0];//Input Ais
  RmemLin[7:0][7 + H:H] → R1[7:0];//L mac from SIMD
  RmemDia[7:0][7 + H:H] → R2[7:0];//L Diagonal Values
  RmemLi:gl[7:0][7 + H:H] → R3[7:0];//Top Row L results
  ; Run Cholesky region specific Kernels
  Lout[V, H] = f (Acc, R[3:8];
endfunc ; Loop for zig zag tiling for maximizing operand availability
for V: 0 → 2 * Vmax {
  ; Schedule Left most Corner Tile on Diagonal Line
  Schedule_CHL (V – HTO, 0);
  ; Schedule Right most Corner Tile on Diagonal Line
```

Cont....

```
if (DTC > 0) {
  Schedule_CHL (V – HTO – DTC, DTC);
  ; Schedule Remaining Tile on Diagonal Line
  for TC: 2 → DTC {
    Schedule_CHL (V – HTO – TC,TC);
  }endfor
}
; generating tile offset on V direction
if (V > Vmax) {
  HTO = HTO + 1;
  ; excluding the tiles below (0,0) coordinate
  if (V is Odd)
    DTC = DTC + 1 – HTO;
}
endfor ; Cholesky micro code for triangular region of the equation ; initialize T4[3:0] ... T7[3:0] sigma value from dependent tile
; initialize T0[3:0] ... T3[3:0] choleskey input values ;calculate 4 elements of first column
T8[3:0]    ←  SUB(T0[3:0] – T4[3:0])
ACC[0]     ←  RECIP(SQRT(T8[0],ctr src))
ACC[3:1]   ←  MULT(T8[3:1],ACC[0],fork to mem)
;update Sigma values of columns, based on 1st column result
T5[3:1]    ←  ADD(MULT(ACC[3:1],ACC[1]),T5[3:1],ctr src)
T6[3:2]    ←  ADD(MULT(ACC[3:2],ACC[2]),T6[3:2],ctr src)
T7[3]      ←  ADD(MULT(ACC[3],ACC[3]),T7[3],ctr src)
;calculate 3 elements of second column
T8[3:1]    ←  SUB(T1[3:1] – T5[3:1])
IMM[0]     ←  RECIP(SQRT(T8[1],ctr src))
IMM[3:2]   ←  MULT(T8[3:1],IMM[0],ctr src, fork to mem)
;update Sigma values of columns, based on 2nd column result
T6[3:2]    ←  ADD(MULT(IMM[3:2],IMM[2]),T6[3:2],ctr src)
T7[3]      ←  ADD(MULT(IMM[3],IMM[3]),T7[3],ctr src)
;calculate 2 elements of third column
T8[3:2]    ←  SUB(T2[3:2] – T6[3:2])
CNST[2]    ←  RECIP(SQRT(T8[2],ctr src))
CNST[3]    ←  MULT(T8[3:2],CNST[2],ctr src, fork to mem)
;update Sigma values of columns, based on 3rd column result
T7[3]      ←  ADD(MULT(CNST[3],CNST[3]),T7[3],ctr src)
;calculate 1 elements of fourth column
T12[3]     ←  RECIP(SUB(T3[3] – T7[3],fork to mem)
```

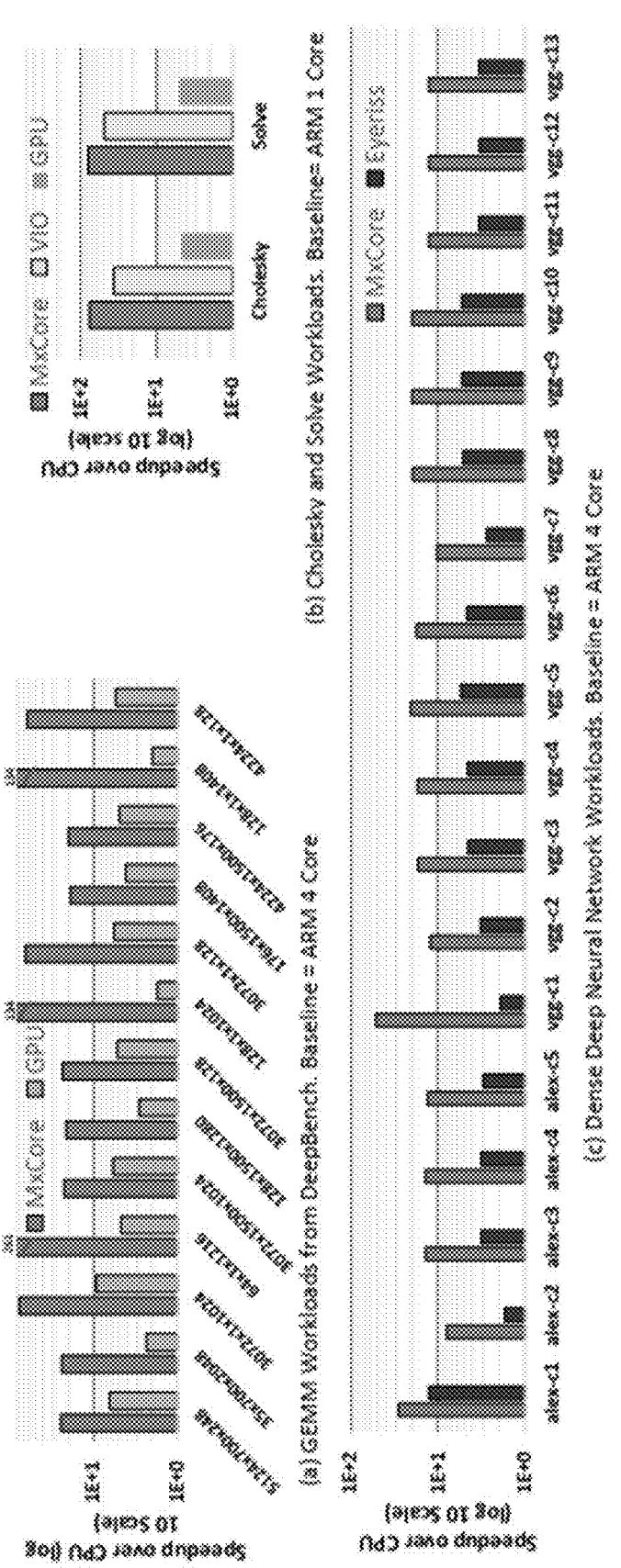
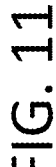
FIG. 11

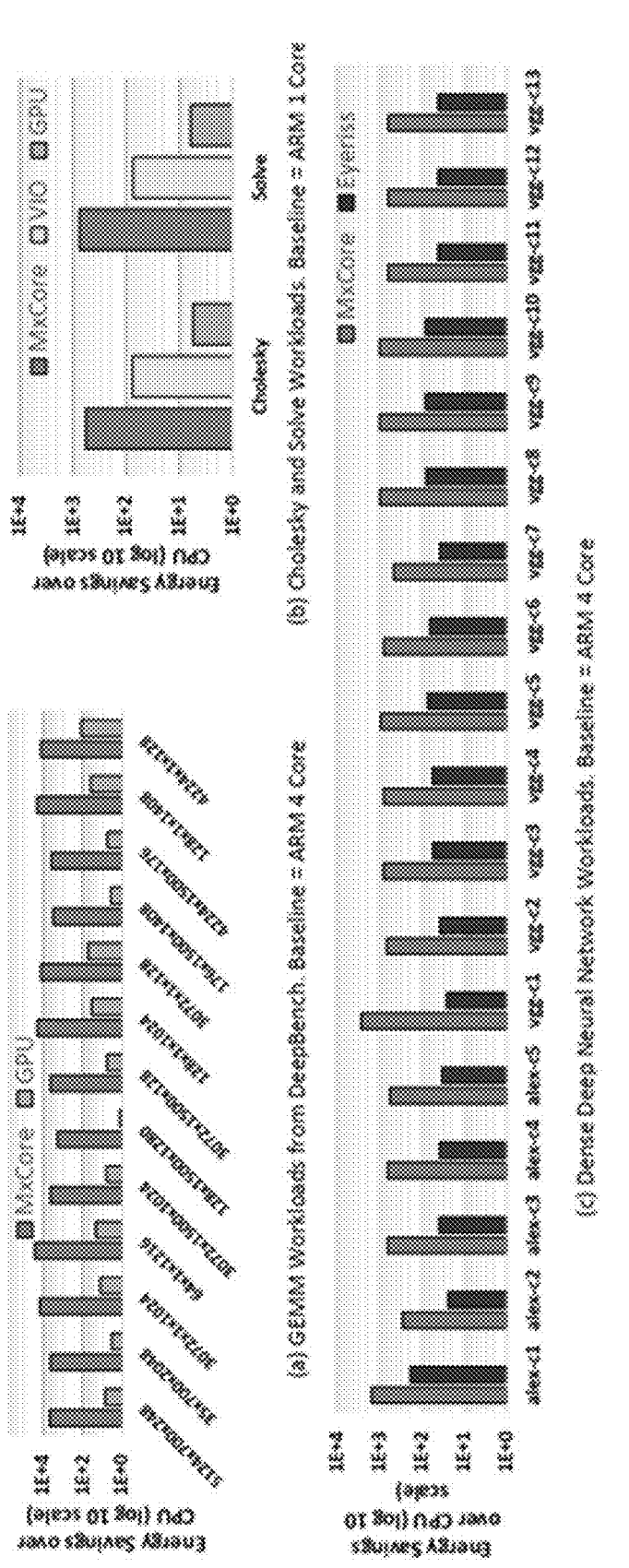
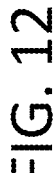
FIG. 12

| Fusion Compiler™ Version R-2020.09-SP5-VAL-20210814 | | | | | |
| TSMC™ 7nm, MMMC 3, MMD.caps3, CCworst_T | | | | | |
| Data Format | FP32+INT8 | FP32 | INT32 | INT8 | INT8 |
| Metric | 1GHz | 1GHz | 1GHz | 1GHz | 1.5GHz |
| QOR | | | | | |
| Area (um^2) (x10^3) Combination | 50.24 | 43.23 | 34.50 | 30.05 | 35.47 |
| W.Combination | 92.48 | 99.48 | 81.29 | 88.25 | 105.21 |
| Buf/Inv | 3.62 | 3.95 | 1.91 | 1.66 | 3.17 |
| Buffer | 2.10 | 2.58 | 0.77 | 0.70 | 2.11 |
| Inverter | 1.52 | 1.37 | 1.14 | 0.96 | 1.06 |
| Total Cell | 143.7 | 142.7 | 115.9 | 118.3 | 140.7 |
| Utilization | 69% | 69% | 56% | 57% | 68% |
| Cell Count (x10^3) Leaf Cell | 643 | 573 | 468 | 424 | 493 |
| Buf/Inv Cell | 57 | 58 | 30 | 30 | 43 |
| Inv Cell | 25 | 30 | 10 | 21 | 21 |
| Combination Cell | 570 | 496 | 404 | 353 | 409 |
| Sequential Cell | 73 | 77 | 64 | 71 | 84 |
| Physical (x10^3) Wire Length(um) | 6600 | 6537 | 5625 | 4843 | 5432 |
| Contacts | 10999 | 10295 | 8843 | 8351 | 9180 |
| Wires | 14411 | 12524 | 10095 | 9164 | 10544 |
| DRC | 39 | 15 | 7 | 10 | 34 |
| Shorts | 5 | 3 | 2 | 2 | 3 |
| VT Usage (%) LVT_L1 | 54.15 | 56.56 | 6.68 | 6.03 | 50.87 |
| LVT_L8 | 0.83 | 0.59 | 0.62 | 1.07 | 1.31 |
| SVT_L11 | 13.34 | 15.54 | 21.43 | 26.20 | 16.11 |
| SVT_L8 | 7.31 | 6.80 | 53.08 | 53.01 | 7.43 |
| Non LVT_L8 | 24.37 | 20.51 | 18.19 | 13.68 | 24.18 |
| Leakage Power (uW) | 11.66 | 11.06 | 6.49 | 6.06 | 11.83 |
| T MACs / mm^2 | 0.15+3.62 | 0.15 | 0.15 | 0.62 | 0.99 |

(b) QOR data of MxCore on TSMC 7nm

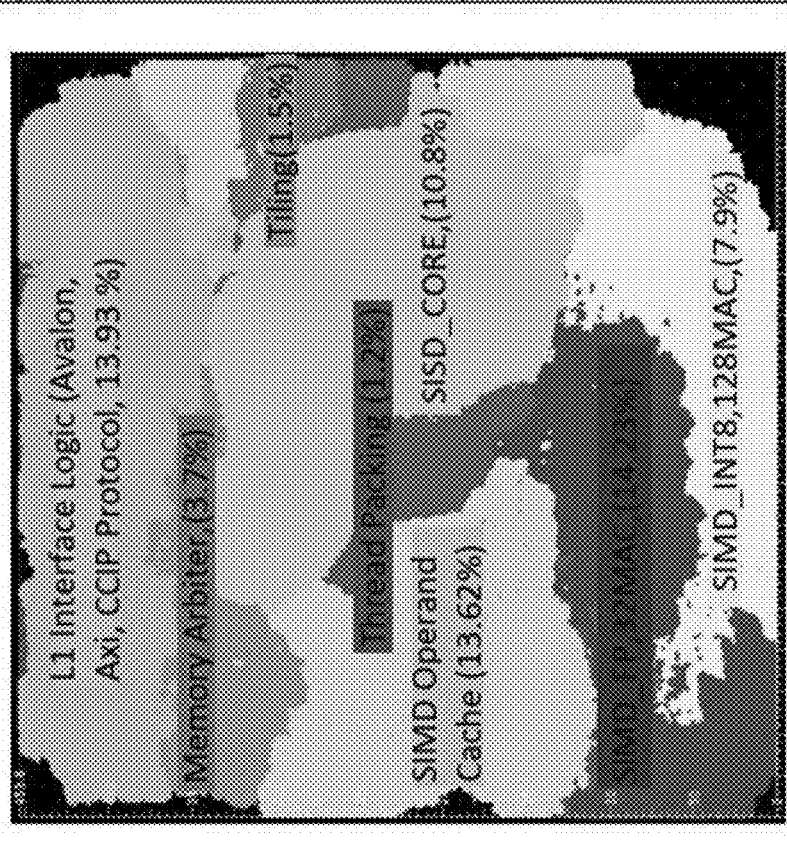

(a) Die Diagram of INT128 + FP32 Config

FIG. 13

MATRIX PROCESSING ENGINE WITH COUPLED DENSE AND SCALAR COMPUTE

CROSS-REFERENCE TO RELATED APPLICATIONS

The present application claims priority to Indian Provisional Patent Application No. 202141049577, filed on Oct. 29, 2021, the contents of which are hereby incorporated by reference in its entirety.

TECHNICAL FIELD

This disclosure relates generally to matrix processing, and particularly to efficient matrix algebra using dense matrix computation in combination with configurable scalar computation.

BACKGROUND

Several algorithms used in Computer Vision (CV) applications and typical Artificial Intelligence (AI) workloads apply various matrix processing algorithms that combine matrix multiplication with various scalar operations. Matrix-multiplication stages and scalar operation stages are often interleaved, with the output of one stage fed as input to another. Cholesky decomposition or triangular matrix solve are examples of such matrix processing algorithms, where square-root or division operations are used as scalar operations to compute final values of diagonal and non-diagonal elements respectively. These equations have a combination of matrix multiplication and per-element scalar operations for calculating results. Similarly, in neural network processing, certain neural network layer operations, such as a convolutional filter may be mapped to a matrix-multiply (multiply-and-accumulate) function, many other operations in neural networks such as pooling, normalization, or activation functions typically need to be performed as operations on a scalar computing core. The output of these operations may then be used as input to matrix-multiplication operations for a next layer's compute.

Vector operations such as matrix-multiplication are often offloaded to a dedicated engine for performance and energy efficiency reasons. A unified architecture for mapping various matrix operations along with different flavors of scalar operations (e.g., activation functions), that includes fine-grained data coupling between vector and scalar operations typically poses significant mapping challenges due to frequent data movements, operand latency and synchronization issues.

Custom accelerator designs may be used with fixed operation and dedicated internal data paths. However, in real-world applications for many use-cases, multiple types of matrix and/or DNN functions are required, thus complicating accelerator solutions and making fixed devices inefficient for more general purposes. In addition, more general solutions are often inefficient in terms of chip-area cost, resource utilization and energy.

An architecture is needed that maximizes compute resource utilization and energy efficiency, while allowing flexible mapping of diverse matrix operations pervasive in modern AI/CV applications allows achieving high performance per watt at low cost.

None of the prior solutions provide a matrix processing engine that comprehensively addresses the requirements spanning performance-per-watt, performance-per-unit-area, flexibility to map diverse matrix processing equations and achieving architectural effectiveness for scaled-up configurations. Most often, existing solutions perform MAC operations separately and the results from MAC operation are moved off of the matrix processor, with the remaining logic of the equations performed by another device (e.g., a host processor or similar compute elements), which compromises efficiency and the programming model.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 5-6 shows one embodiment of a scalar processing core a supported instruction format, according to one embodiment.

FIG. 10 shows an example tiling algorithm of Cholesky decomposition, according to one embodiment.

FIGS. 11-12 show comparative performance of one embodiment of the matrix processor relative to other computing circuits for performing matrix equations.

FIG. 13 shows example physical synthesis of the MxCore embodiment.

DETAILED DESCRIPTION

Overview

Figure 1:
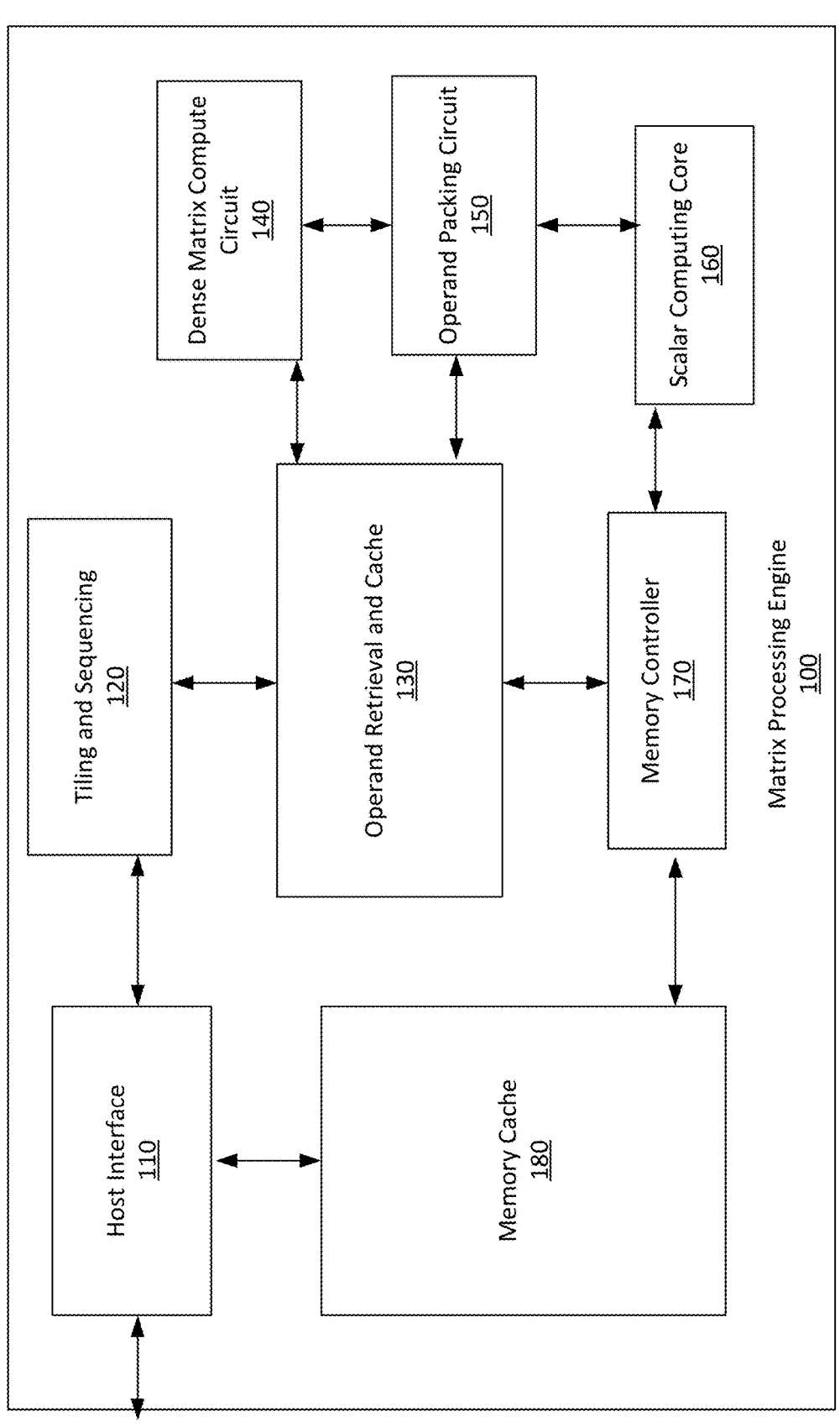
FIG. 1 shows an example matrix processing engine, according to one embodiment.

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

This disclosure includes an architecture for a matrix processing engine that effectively combines efficient matrix computation of a dense matrix compute circuit with a scalar computing core. The dense matrix compute circuit may be a single-instruction-multiple-data (SISD) computing device, which performs a single instruction on multiple data sets. Similarly, the scalar computing core may be a single-instruction-single-data (SISD) computing device which performs individual operations on individual data sequentially according to its instructions. The SISD device may also be capable of parallel execution of multiple different instructions on different data (e.g., it may be multithreaded and permit out-of-order execution based on dependencies). The dense matrix compute circuit may thus also be referred to herein as a SIMD core or SIMD circuit, and similarly the scalar computing core may be referred to as a SISD core or SISD circuit.

The matrix processing engine provides an architecture for combining the data processing and smoothly loading results from the dense computation into the scalar computing core. The architecture may generate dense compute results via a dense matrix compute circuit and then generate thread packets with the dense compute results in addition to any additional data used in the scalar computation. The thread packets are loaded to the scalar computing core, which runs a set of corresponding instructions in a processing thread to compute outputs. As such, the architecture provides a way of binding the two computing circuits and automatically create threads for scalar processing of the dense compute results when the relevant dense compute results are available. This provides an ability to automatically spawn execution threads (onto a programmable core) upon operand readiness, which delivers improved performance per area and performance per watt as explained below.

The matrix processor in one embodiment thus comprises a dense matrix compute circuit, such as a multiply-and-combine circuit (MAC) that performs dense vector computation and a programmable super scalar core (e.g., a SISD Core) for distributed scalar computations. Additional techniques as described below enable tight coupling between the two computing devices through in-line thread formatting and in-line register buffers. That is, the output of the dense matrix compute circuit may be buffered and formatted for a thread of the scalar computing core "in-line" between the two compute components. As such, the results of the dense matrix compute circuit (which become operands of the scalar computations) may be consumed by the scalar computing core without delay or data transfer out of the overall matrix processing engine. The buffers may have various sizes, such as 8×8. The dynamic grouping of operand data from the inline register buffer in terms of one or more thread-packet groups (e.g., an 8×8 register buffer could be supplied as operand(s) to four sisd_4×4, two sisd_4×8, or one sisd_8×8 thread packets) provides flexibility in kernel mapping and reduces a kernel's size complexity. In addition, the threads for the scalar computing core may be automatically created (and the associated instructions begin to execute) when the thread packets are ready, providing an ultra-low latency signaling mechanism for initiating scalar computing.

In various embodiments, an in-line register buffer of size 8×8 (as the tiling logic divides execution block in terms of 8×8 tiles) permits options for different thread grouping (sisd_4×4, sisd_4×8 or sisd_8×8 threads) based on SISD kernel (e.g., the scalar compute instruction) complexity, and the different thread grouping between the vector (i.e., dense matrix compute) and scalar processor allows tight interface coupling of both compute blocks. In various embodiments, the scalar computing core includes a "Copy" instruction that allows an active thread to copy operand data from queued thread packets into the active thread's programming register space. This feature enables sharing of operand data between adjacent threads and reduces the latency of sharing modified data to successive stages.

As such, in addition to the interface of vector & scalar compute engine, in embodiments the special instruction set architecture (ISA) instructions and programmability of the scalar computing core enables flexibility for mapping different matrix equations onto the matrix processing engine. The disclosed solution can map matrix algebra that requires both dense and scalar computation, with less overhead of transferring data between memory and compute buffers. This is enabled by an architecture that feeds SIMD results directly to a programmable micro core as operands where scalar computation is performed along with other operands, and tiling logic can efficiently schedule compute blocks of the matrix operations.

In various embodiments, the instruction set architecture (ISA) includes a copy instruction that allows sharing of the operand data between an actively running thread to and another thread (e.g., a thread packet in queue or an executing thread), by copying data from a thread packet of a thread in queue. This instruction helps to divide large scalar programs (e.g., a SISD_Kernel) into small kernels as well as for sharing dependent operands between threads within a thread family group in the scalar computing core via the executing kernel. This may permit fast, sequential execution of tiled data even where there are dependencies between one data tile and another by retrieving the required information packaged for one thread to the requesting thread consuming thread, within the matrix processing engine and obviating the need to save such data to memory before its subsequent use or package it to multiple thread packets. This flexibility to include additional instructions to the scalar compute instruction list while being programmable make the solution scalable and flexible for mapping of various matrix algebra.

Various configurations of the matrix processing engine provide a unified matrix processor for mapping various matrix algebra that includes matrix multiplication, Cholesky decomposition, matrix Solve, DNN, etc. onto the same compute resource for achieving both power and performance per area. Binding of both SIMD and SISD compute resources along with various thread packing options provides unified computation across both computing types, improving execution of complex matrix equations while maintaining significant configurability. Because of the tight coupling and the scalar computing core's instruction set architecture (ISA), a matrix processor's tiling and sequencing logic can map various matrix equations efficiently onto a dense matrix compute circuit (SIMD) and a scalar computing core (SISD). Discussed below are examples for mapping of SGEMM, Cholesky decomposition and CNN for showcasing methods to map different matrix algebra of various complexity level to achieve higher resource sharing (perf/mm^2). This unique way of wrapping vector compute, super scalar core along with inline buffer and the capability of copying of operand data across threads enables the matrix processing engine to meet performance per watt per area efficiency significantly higher than other configurable matrix processing engines.

For purposes of explanation, specific numbers, materials, and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

In the following detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. The meaning of "a," "an," and "the" include plural references. The meaning of "in" includes "in" and "on."

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. The terms "substantially," "close," "approximately," "near," and "about," generally refer to being within +/-20% of a target value. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

Matrix Processing Engine Overview

FIG. 1 shows an example matrix processing engine 100. The matrix processing engine 100 performs configurable processing on one or more input matrices through a combination of a dense matrix compute circuit 140 coupled with a scalar computing core 160. The matrix processing engine 100 includes various components for sequencing and loading data and instructions, as well as for loading data for processing by the dense matrix compute circuit 140 and may also include an in-line register for packing dense compute results into thread packets for execution of processing threads with configurable scalar instructions. This disclosure thus presents novel techniques for more-tightly coupling vector and programmable scalar engines with configurable (i.e., custom-defined) instruction sets. This enables achieving high performance (e.g., similar to application-specific integrated circuit (ASIC)) across multiple types of workflows (e.g., particular matrix equations or processing algorithms) without requiring multiple dedicated accelerators and thus improving the circuit performance/mm {circumflex over ( )}2 relative to prior configurable matrix processing engines.

Generally, matrix operations to be processed by the matrix processing engine 100 may be represented as a combination of dense vector computation and scalar computations. Dense vector computation refers to calculations in which the same calculations may be performed on multiple data sets, such as row-column matrix multiplication. The dense computation is performed by the dense matrix compute circuit 140. Results from the dense computation may be used as input operand for scalar computation. In one embodiment, dense compute fields are executed in a single-instruction-multiple-data (SIMD) compute array structure and the rest of an operation, if any, is executed in a single-instruction-single-data (SISD) core through microprograms. The SIMD computations of the matrix processing engine are performed by the dense matrix compute circuit 140, while the scalar operations are performed by the scalar computing core 160. The scalar computing core 160 is programmable (e.g., with microcode) and performs operations based on a set of instructions (e.g., a programming kernel) that may vary according to the particular computation being performed. This programmable core allows mapping of computation for various matrix algebra using the SIMD computation results. As such, the scalar computing core 160 can a execute a user defined microprogram (e.g., SISD-kernel microcode) that can take SIMD vector result as one operand along with other operands from memory, for final execution.

The same microprogram of the scalar computing core 160 can be used to reformat the resultant matrix while writing to memory or can be used to duplicate result matrix to multiple locations in memory if the system demands. The programming flexibility in the scalar computing core 160 along with equation-specific integrated tiling and sequencing logic for scheduling compute blocks (as discussed below) allows the matrix processing engine 100 to efficiently map various matrix kernels for diverse uses without hardware modifications.

The matrix processor as shown in FIG. 1 thus binds vector and scalar compute resources for efficient matrix processing. The matrix processing engine 100 may process matrices of various sizes depending on the provisioned circuitry, and may be configured to load and process matrices of various types. In general, the scalar computing core 160 may output data tiles (or sub-tiles) of various sizes, such as 4×4, 8×4, or 8×8 as a function of the scalar computing core instructions (i.e., the SISD kernel) applied to an output of the dense matrix compute circuit 140 and optional additional data. The output of the scalar computing core 160 is termed O. The dense matrix compute circuit 140 may operate on a pair of operands, termed dense operand A and dense operand B, used to dense compute results that may be used for a dense matrix result tile. The dense operand A and B may also be matrices and may be selected from respective matrix A and matrix B according to the particulars of the overall kernel algorithm.

In one embodiment, the output of the scalar computing core 160 is tiled into 4×4 data tiles (or sub-tiles) obtained from processing 4×4 tiles determined from an 8×8 dense matrix result tile obtained by a multiply-and-accumulate operation performed by the dense matrix compute circuit 140. That is, the dense matrix compute circuit 140 may perform a single instruction multiple data (SIMD) MAC operation on its input operands. In this embodiment, the matrix processing engine 100's compute abstraction can be represented as:

Out [4, 4×4]=SISD_kernel [4,4×4] (SIMD_MAC [4,4×4] (A (8×N),B (N×8)), R[ ][4,4×4]);

where four 4×4 tiles are output based on the natively supported SISD instructions applied 4×4 data tiles obtained from an 8×8 dense matrix result tile, along with additional operand data tile R. As such, the individual selection of A and B operands, the additional operand data, and the specific SISD instructions allows the mapping of a large number of different algorithms to the matrix processing engine 100. As such, tiled operand data may be routed through the dense matrix compute circuit 140 for dense calculations and the result is combined with other operands by an operand packing circuit 150 to create thread packets to run in the scalar computing core for final calculations. The individual data tiles may be sequenced, based on operand dependency as well as availability of compute resources, permitting higher execution efficiency of various matrix algebra.

The matrix processing engine 100 includes various components for performing the matrix operations discussed herein. In general, the components discussed below may be implemented in various circuitry within the matrix processing engine 100. As a general overview of the components, a host interface 110 communicates with a host system of the matrix processing engine 100. A tiling and sequencing component 120 determines individual computation tiles for the compute circuits and the related data to be fetched for performing the computations, along with related sequencing to account for data dependencies and reduce memory-access delays. To begin processing the tiles, the operand retrieval and cache 130 may retrieve necessary data for processing of various output tiles, which may include constituent SISD instructions, data tiles processed by the dense matrix (to generate the dense compute results input to the scalar computing core) along with thread packet generation parameters and any other data used by operand packing circuit 150 to create thread packets for the scalar computing core 160. These and additional components are further discussed below.

The host interface 110 provides communication and data read/writes to a host system of the matrix processing engine 100. The host interface 110 may receive instructions from the host system to perform a matrix computation. The host interface 110 may receive an identification of a matrix equation to be performed and an identification of the input matrices to be used in the matrix equation. In some embodiments, the matrix processing engine 100 includes microcode (e.g., SISD instructions for the scalar computing core 160) for performing various matrix equations, such as those discussed more fully below. The matrix processing engine 100 in these embodiments may include algorithms and processing for performing the tiling and sequencing of calculations of the designated matrix equation. In other embodiments, the host system provides the related tiling, sequencing, instructions for the scalar computing core 160 related to each tile processed by the scalar computing core 160, and so forth. Stated another way, while in some embodiments the tiling and sequencing component 120 may perform tiling and sequencing based on a supported matrix equation, in other embodiments the related tiling and instructions are provided from the host system via the host interface 110. The host interface 110 thus also provides a communication channel for accessing a memory and other storage for the input data used by the matrix processing engine 100. For example, in one embodiment the memory cache 180 is optional, and in others the memory cache 180 is a L1 cache that stores local memory data only; such that the memory for input matrices may be retrieved via the host interface 110.

The tiling and sequencing component 120 divides input operands into tiles for calculating fixed output size and drives the flow of execution. The tiling and sequencing component may retrieve matrix parameters (such matrix dimensions) from the host through the host interface 110 and determine tiles from the matrix parameters. A tile is defined as a unit of operand elements, which are fetched and processed in a number of clock cycles. The sequencing component in one embodiment includes a set of counters for each operand and determines a sequence in which to traverse the tiles for performing operations in calculating outputs and in accessing related input and related tile processing data. Such processing data may include kernel instructions for executing processing threads for the tile in the scalar computing core 160 as well as configuration information for packing operands to thread packets by the operand packing circuit 150.

The tiling and sequencing component 120 may enable efficient mapping of various matrix algebra by tiling data with operand-dependency-aware traversal. Tiling and Sequencing logic can determine an optimized walking order to populate both the dense matrix compute circuit 140 and the scalar computing core 160 efficiently, and in one embodiment may use an in-line buffer to allow flexible operand grouping and thread spawning for the scalar computing core when operands are ready from the dense matrix compute circuit 140. of the operand packing vector and programmable core and inline buffer allows flexible operand grouping and auto thread spawning on super scalar core.

As such, the tiling and sequencing component 120 provides integrated tiling and tile sequencing logic for mapping various matrix equations to both vector and scalar compute elements. The tiling algorithm divides input matrices into blocks of computational tiles that can be fit into the dense matrix compute circuit 140 structure for dense computation. Sequencer logic is used to control ordering of tiles as tile walking patterns can change the overall execution performance Sequencer logic ensures compute tiles are scheduled based on operand dependency of matrix equation so that compute structure of matrix processors runs efficiently. Tiles may also be generated while keeping output stationary, for retaining partial results locally for overall system's power efficiency by avoiding external memory interaction for the computation of the selected output tile size. Additional details for tiling data and scheduling tile execution for various specific matrix equations are further discussed below. As noted above, while in this example the tiling and sequencing component 120 may determine tiling and sequencing for particular matrix equations, in other embodiments the functionality of the tiling and sequencing component 120 may be performed by a host system that provides the data tiling and dependency to the matrix processing engine 100.

The operand retrieval and cache 130 includes logic that controls data fetch, response, and organization of data and related processing information into data buffers before feeding to the compute engines. The operand retrieval and cache 130 includes a cache-lookup structure to search data into line-buffer/caches to avoid re-fetches. Internal structures and FIFOs are designed to handle variable latencies at memory interface. The read path of the operand retrieval and cache 130 may have multiple memory ports to the host system to make use of available system bandwidth. As discussed in further figures, the operand retrieval and cache may provide related data to the dense compute circuit 140, and operand packing circuit 150, to process and generate the thread packets for consumption by the scalar computing core 160.

A memory controller 170 arbitrates memory read/write requests before requests are placed to the memory cache 180, which may be an L1 memory system. The memory controller 170 may also perform a memory validity check through memory qualifying logic before placing L1 request to ensure memory reads are performed only after memory writes.

The dense matrix compute circuit 140 is a dense compute unit configured to perform an operation on its operands, executing the same operation across multiple data sets (i.e., a SIMD computing circuit). The dense matrix compute circuit 140 may include various circuit components, such as multipliers and adders, for performing the operation. In some embodiments, the operation performed by the dense matrix compute circuit 140 is not configurable, such that the dense matrix compute circuit 140 performs the same operation on its respective input operands. In one embodiment, the dense matrix compute circuit 140 is a SIMD FP32 MAC that performs a multiply-and-accumulate operation on its operands. In this embodiment, as further shown in FIG. 4, the dense matrix compute circuit 140 may be implemented as a MAC compute circuit 400 having multipliers arranged in a 2D grid with adders adding multiplier's output in a column. In this example, a plurality of channels P are computed by multiplying and adding a respective number N of values for each channel. In one embodiment, the dense matrix compute circuit 140 thus receives and processes 2×N×P data elements (two input values multiplied together, N times across P channels) and produces P output channels (i.e., elements) per cycle. The dense matrix compute circuit 140 may also include data registers or inline buffers to store partial results (e.g., a dense compute result tile) along with P accumulators to accumulate results for accumulation of multiplication across multiple clock cycles, as required by particular matrix equations.

The operand packing circuit 150 groups operands from dense compute results as well as from memory using operand gather logic. Thread packets containing operands for processing threads of the scalar computing core 160 are created based on SISD kernel requirements and loaded into an operand packet cache buffer of the computing core for execution. Depends on the microcode's output tile size, operands are packed using sisd_4×4, sisd_4×8 or sisd_8×8 thread formats. SISD_4×4 calculates an output tile size of 4×4, whereas sisd_4×8 and sisd_8×8 can generate an output tile size of 4×8 and 8×8 respectively.

Figure 5:
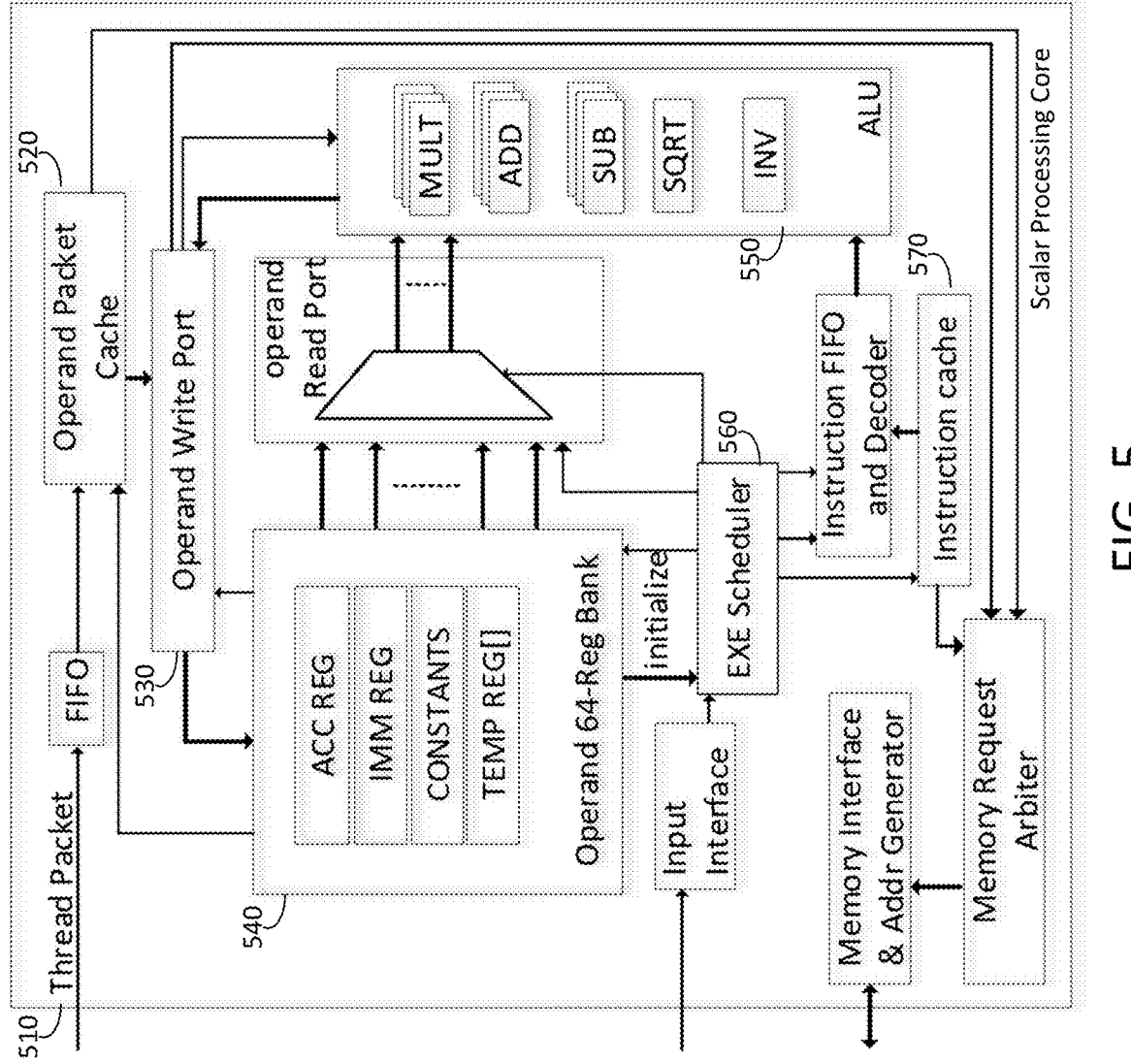

The scalar computing core 160, further discussed in FIG. 5, executes kernel instructions stored in memory in conjunction with operand data from thread packets. Instructions are read through instruction cache for decode and execution. The scalar computing core 160 may be a superscalar computing core and support concurrent scheduling of instructions and multi thread execution. It can be used for performing scalar or distributed computation of matrix equations of interest. In addition, the scalar computing core 160 may support upscaling with additional instruction sets for mapping various matrix algebra efficiently. That is, additional kernel instructions may be used to program and execute additional matrix equations and algorithms with the scalar computing core 160.

Figure 2:
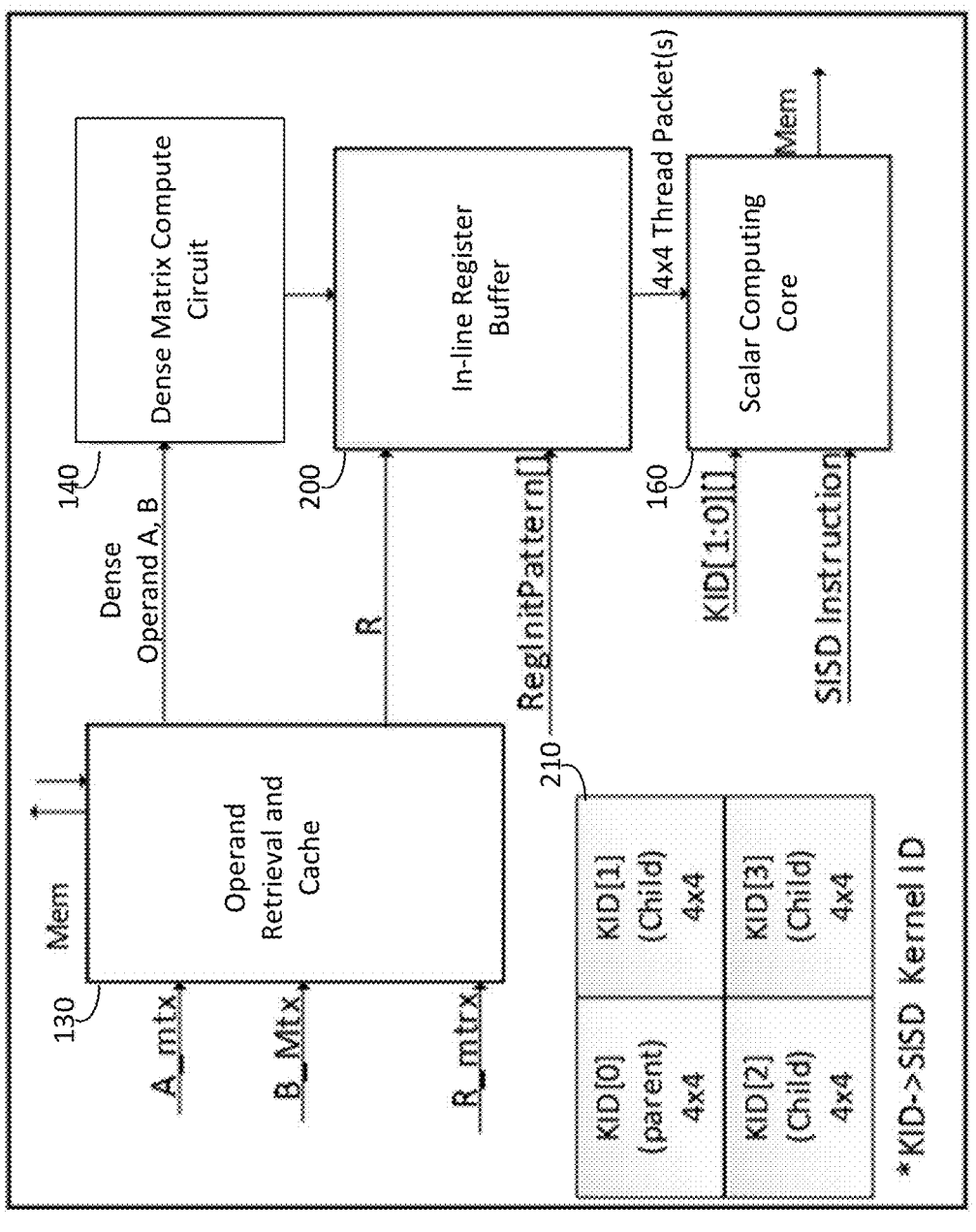
FIGS. 2-3 shows an example tiling of operands and preparation of thread packets for processing by the scalar computing core to generate output data, according to one embodiment.
Figure 3:
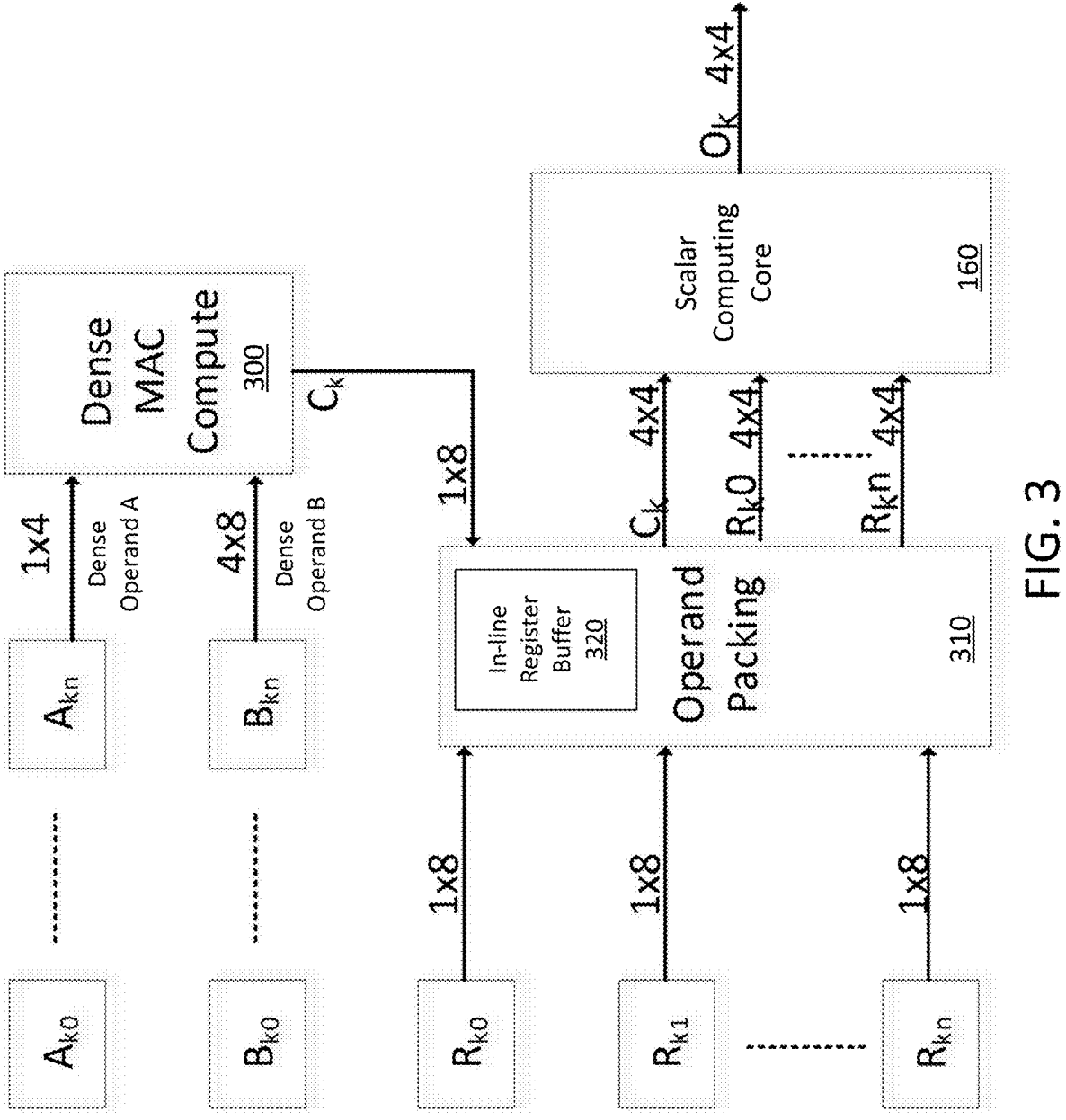

FIGS. 2-3 shows an example tiling of operands and preparation of thread packets for processing by the scalar computing core 160 to generate output data. As discussed above, the scalar processing core operates on dense matrix results that are the generated from the dense matrix compute circuit 140. In one embodiment, the scalar computing core 160 is tightly coupled to the dense matrix compute circuit 140 through an in-line register buffer 200. The in-line register buffer 200 may be a component of the operand packing circuit 150 or a component of the dense matrix compute circuit 140 for providing outputs to the operand packing circuit 150.

Figure 4:
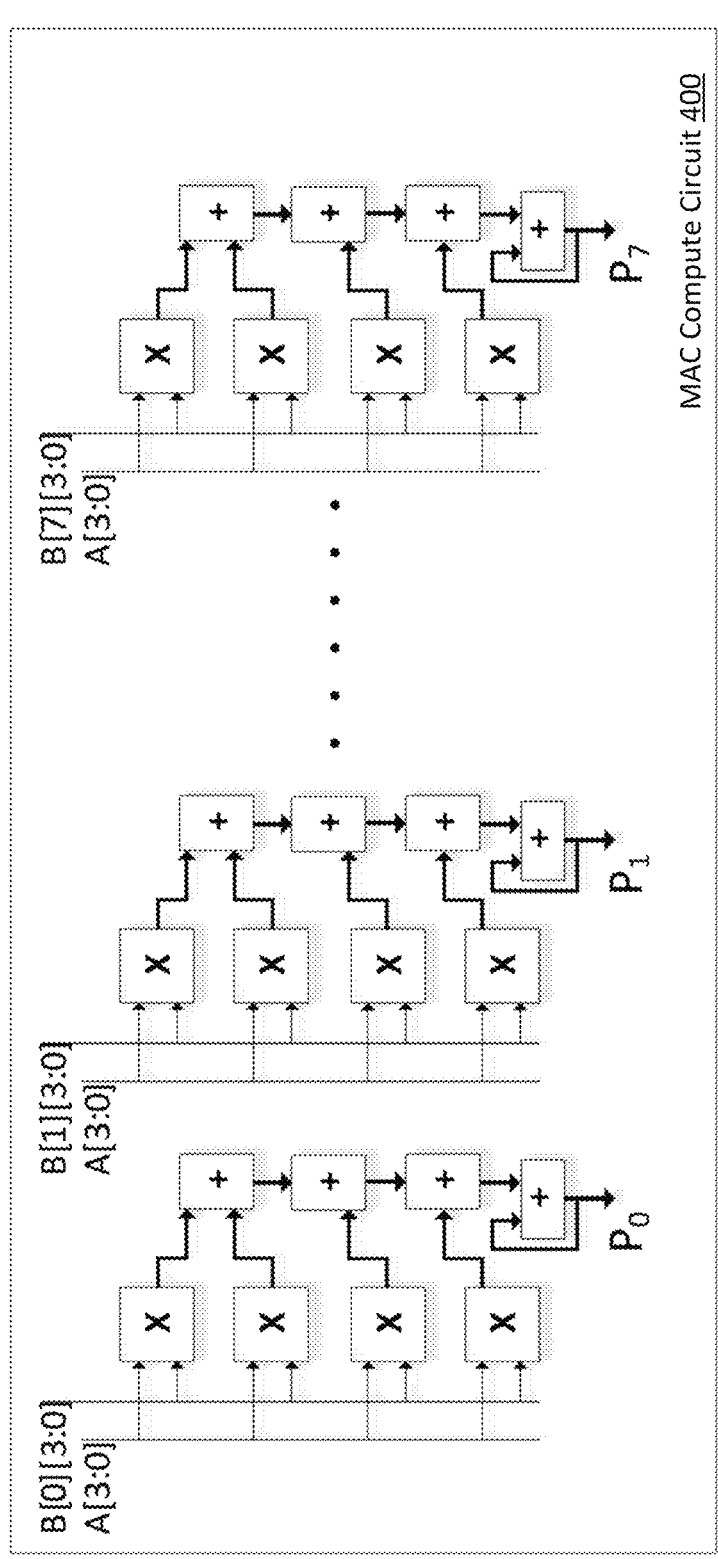
FIG. 4 shows an example configuration of the dense matrix compute circuit, according to one embodiment.

FIG. 4 shows an example configuration of the dense matrix compute circuit 140. The dense matrix compute circuit 140 in one embodiment contains an array of multipliers and adders spread across in a 2D grid. The 2D grid performs a multiply-and-accumulate operation, as may be used in matrix multiplication with data spread in two dimensions (rows and columns) In one embodiment, the dense matrix compute circuit 140 generates a dense compute result tile of size 8×8 and may be accumulated from several clock cycles of executing the dense matrix compute circuit 140. In this example of the dense matrix compute circuit, 4 elements of A operands are broadcast to 8 independent channels of a 32-MAC 2D compute array as shown in FIG. 4. Each of the 8 independent channel outputs (from the 8 independent channels P) output over time may be combined to generate the 8×8 dense compute result tile. In other embodiments, the dense matrix compute circuit 140 is scaled on a horizontal (additional channels P) and/or vertical direction (additional MAC calculations for each channel). More compute on horizontal direction (additional channels) enables additional parallel paths whereas scaling on vertical direction results in higher accumulation per clock, per channel.

As further discussed with respect to FIG. 5, the scalar compute core includes instruction fetch, decode, execute path and interfaces for thread packets that include both dense compute results as well other operands fetched from memory. In one embodiment, the scalar compute core has 64 registers for programming and has 8 multipliers, 4 adders, one sqrt and one inverse as compute elements. The arithmetic logic unit (ALU) resources may be determined based on compute requirement for the supported matrix equations. Resources can be enhanced based on requirements for mapping different equations.

Returning to FIG. 2, thread packing logic of the operand packing circuit 150 gathers both dense compute results and other operands fetched from memory and generates thread packets from an in-line register buffer 200. Operands are grouped to create threads packets and these operands are loaded into register space of the core for performing instruction execution. Thread operands may be backed up to an operand packet cache for efficient hardware utilization while handling multiple child and parent threads for supporting concurrent thread execution.

In one embodiment, the dense matrix compute circuit 140 is fed with two input operands from matrix A and matrix B. A unit of data elements for A/B operands which is processed in cycle is called tile. A tile worth of data is fetched by the operand retrieval and cache 130. Output produced from dense compute is accumulated in an in-line register buffer 200 and managed by a thread packetizing logic to feed the scalar computing core 160. Additional operands termed matrix "R" may be retrieved by operand gathering logic and combined to generate the thread packets. The in-line register buffer 200 may store an 8×8 data tile, which may include an 8×8 data tile for the dense compute output data and the additional data matrix R. In one embodiment, the 8×8 data tiles are packed to 4×4 thread packets provided to the scalar computing core 160. In addition, the tiles may also be associated with kernel instructions based on a kernel identifier 210. The kernel identifiers 210 may be used by the scalar computing core 160 to identify the applicable instructions in the instruction cache for a particular thread packet in the thread packet cache. As such, thread packets may contain other operands (R0-RN) from operand gathering logic along with dense compute results for feeding scalar computing core 160, which may use the Kernel ID to match thread packets with applicable kernel instructions for a thread.

As noted above, for an optimal execution, input operand matrices are divided in terms of compute tiles. The A and B operands are designated for dense compute by the dense matrix compute circuit 140 and additional "R" operands, e.g., R0 to RN are used for scalar compute operands of the scalar computing core 160. Output elements may then be generalized as a function of A, B and R0-N operands. In one embodiment, to balance compute and memory bandwidth, an 8×8 output tile dimension is used and may be abstracted as: Out[4, 4×4]=SISD_kernel[4,4×4](SIMD_MAC[4,4×4] (A(8×N),B(N×8)), R[ ][4,4×4]); where SISD instructions are used for mapping different algorithms. Depending on the particular input equation for calculating output tile O, multiple tiles of A and B operands provided to the dense matrix compute circuit 140 and corresponding R tiles retrieved or generated for scalar compute as shown in FIGS. 2-3. At the tiling stage, necessary tile information is generated for gather logic to collect operand data from memory by the operand retrieval and cache 130. In addition, the operand packing circuit 150 may process thread packing parameters for converting the dense compute results and R matrix from the in-line register buffer 200 to thread packets for the scalar computing core 160.

In one embodiment, because of the in-line register buffer 200 between the SIMD and SISD cores (e.g., dense matrix compute circuit 140 and scalar computing core 160, there is no partial or intermediate result temporarily stored at external memory—the dense compute results may be packaged as operands in thread packets for execution by scalar processing threads directly. As such, a single pass execution may be performed without intermediate partial writes and reads from extremal memory. In one embodiment using the programmability of SISD core, matrix operation can perform single pass execution with no partial results to external memory, irrespective of blending or scalar functions of any kind that follows dense compute, significantly improving single pass execution.

Similarly, in one embodiment, the in-line thread packet generation with an in-line register buffer 200 for interfacing SIMD and SISD compute along with various thread packet operand grouping (sisd_4×4,sisd_4×8 or sisd_8×8) reduces execution latency of operand dependent matrix algebra as in Cholesky decomposition. Similarly, as discussed below, the use of a "copy" instruction between thread data (e.g., from a queued thread packet) provides a means for reducing latency across threads and reducing memory access delays. Because the thread packets are generated from the dense compute results, threads may be automatically spawned based on the thread packets to keep the scalar computing core 160 loaded with execution packets as soon as the operand dependency is cleared.

FIG. 3 shows an example embodiment for operand packing 310 of operand tiles for a scalar computing core 160 of an output tile 4×4. In this example embodiment, the data tiling for the dense compute follows a tile walking pattern of A and B operands that balances available compute and memory bandwidth. In this example, the dense compute is performed by a dense MAC compute circuit 300, such as the MAC compute circuit 400 shown in FIG. 4. As shown, the dense MAC compute circuit 300 receives a dense operand A having dimensions 1×4, which is broadcast to all channels of the MAC compute circuit and a dense operand B having dimensions 4×8, such that the 4 data elements of dense operand A are multiplied with respective 4 data elements of the 8 channels and accumulated. This produces an output tile of size 1×8 (more generally, 1×P, where P is the number of channels) per clock. As the input tiles for the dense MAC compute circuit 300 (e.g., the dense operand A and dense operand B) are modified over clock cycles, as shown by inputs $A_{k0}$-$A_{kn}$ and $B_{k0}$-$B_{kn}$, the dense MAC compute circuit 300 produces burst of 1×8 tiles of output matrices for successive 8 clocks (corresponding to processing $A_{k0} \times B_{k0}$ through $A_{kN} \times B_{kN}$), producing a dense matrix result tile having an 8×8 size that may be stored in an in-line register buffer 320. Similarly, additional scalar operands ("R") may also be generated at tile sizes of 1×8 for successive 8 clocks to generate an 8×8 size of the R matrix. Operand packing block 310 can further group the operand blocks into sub tiles according to the register space and kernel available. In one embodiment, the operand tiles gather 8×8 tile size and are further grouped into 4 numbers of 4×4 tiles and executed as one parent and 3 child threads. In one embodiment, the scalar computing core 160 provides a kernel for 4×4 tiles and 64 registers is available for programming.

FIG. 5 shows one embodiment of a scalar processing core 500 and FIG. 6 shows a supported instruction format, according to one embodiment. The scalar processing core 500 is one implementation of the scalar computing core 160 that may be used for SISD instructions. In one embodiment, the scalar processing core 500 may be a superscalar core that supports execution of concurrent threads and instruction ordering based on dependencies for the related threads. Each thread has 64 registers for programming. In one embodiment, special copy instructions for sharing operand data between active thread in execution and thread in queue for execution, effectively reduces latency of operand supply. The scalar processing core also support parent child relation for threads that have kernel instructions or inter-related data to be processed beyond the thread capacity of 256 instructions/thread. A "Copy" instruction [Copy (destination address, source address)] allows sharing of operand data between a running thread and a waiting child thread's operand space. Particularly, the instruction (as executed in the active thread) may retrieve data from a waiting thread's data. In addition, programing register space s can be selectively retained with data (after a parent thread ends) for a successive child thread to use unless it's a last child thread of the same family. As such, in one embodiment, the matrix processor permits retaining valid operands in programmable register file of the scalar processing core 500 even after termination of threads for subsequent child thread to consume in context of operand sharing. Instructions are also supported for forking matrix results to external memory (i.e., on a host device) while writing to the register of the scalar processing core 500, permitting processing results to readily be output to memory as the values of output tiles while also enabling ready availability of relevant output data for further processing by operations of other processing threads with operand dependencies on the output tile. For example, in the Cholesky decomposition, the output values for certain positions in the matrix may depend on the output values of other positions in the matrix in addition to the input matrix. E.g., an output L at position i, j (Li,j), may be a function of the input A i,j and other output positions Li,k and Lj,k as further shown in FIG. 10.

FIG. 5 shows further components of the scalar processing core 500. As discussed above, the generated thread packets 510 are stored in an operand packet cache 520, that when ready for execution may be written by an operand write port 530 to registers 540 for use by executing processing threads.

The logical processing of the scalar computing core 500 is performed by a set of circuits in the arithmetic logic unit 550 that executes instructions based on the scheduling by a scheduler 560 of instructions in an instruction cache 570. The thread packets may be sequenced and matched with instructions based on the KID (kernel ID) of the input threads, which may also specify thread-family relationships (e.g., parent-child threads). As a result, when thread packets are available in the operand packet cache 520, threads may be automatically created with the relevant instructions as the operands are ready (i.e., the thread packet 510 is received and waiting in the operand packet cache 520).

Figure 7:
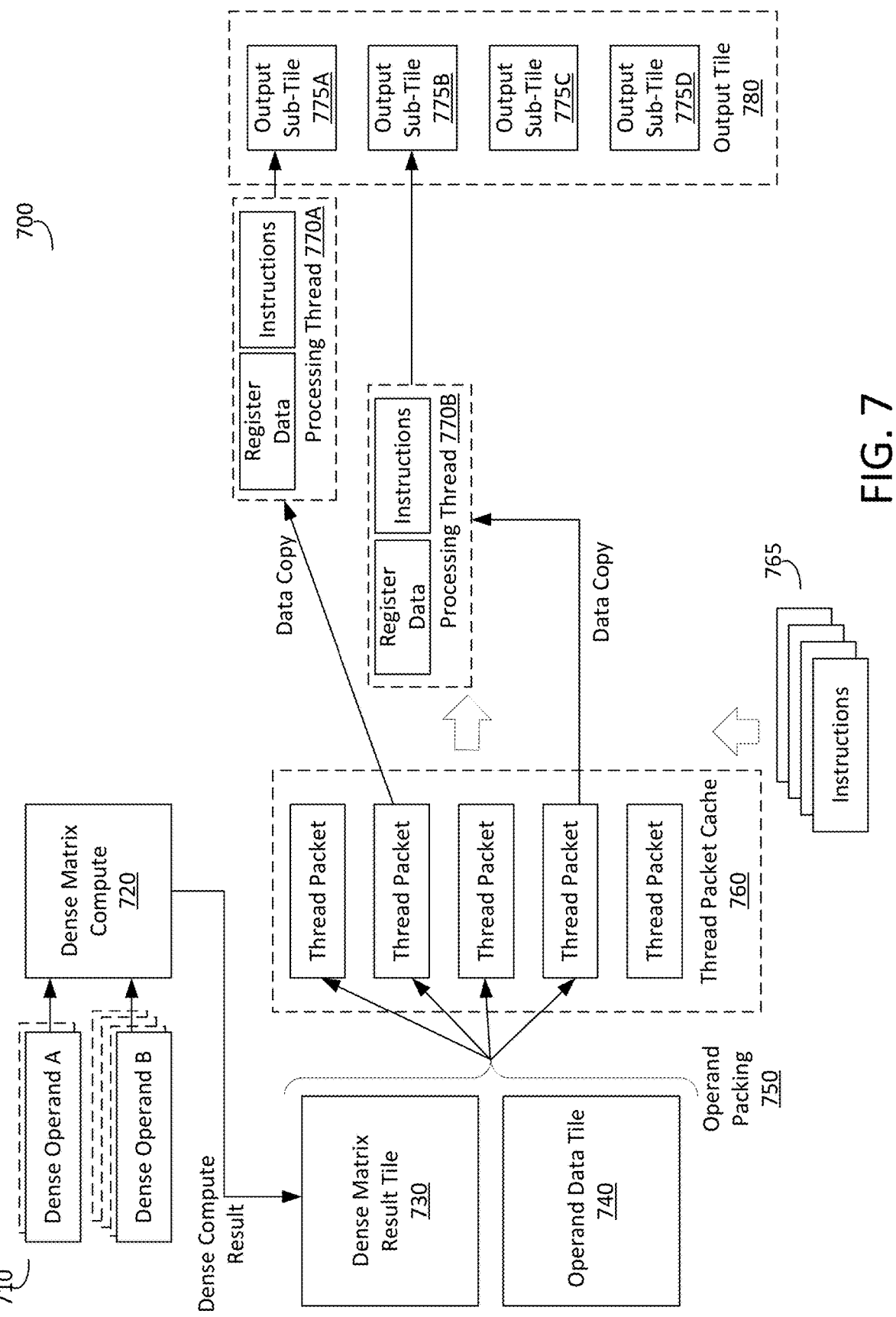
FIG. 7 shows an example execution workflow for generating an output tile according to one embodiment.

FIG. 7 shows an example execution workflow 700 for generating an output tile 780 according to one embodiment. Each output tile 780 in one embodiment may be an 8×8 matrix that is computed as a set of 4×4 output sub-tiles 775A-D. Discussed above, the output tile 780 is a function of the kernel instructions operated on a set of dense matrix results and additional operands ("R") matrix. As discussed above, the relevant data operands and instructions may be fetched and tiled for efficient collection and throughput in the dense matrix compute 720 and subsequent compute through processing threads 770 of the scalar compute core.

As such, to generate the dense matrix result tile 730 to be packaged in thread packets, dense operands 710 are fetched and provided to the dense matrix compute 720 for computation of a dense compute result. In one embodiment, a sequence of dense operands is provided to the dense matrix compute 720 for processing over a sequence of clock cycles to accumulate the dense matrix result tile 730 using the dense compute results created by the dense matrix compute 720 as each dense operand 710 is processed by the dense matrix compute 720. As discussed above, the dense matrix result tile 730 may be stored in an in-line register buffer, such that the results from the dense computation may be readily processed by the scalar processor and enable processing of matrix algorithms/equations with sequenced dense and scalar processing without requiring writing partial results to an external memory. Likewise, additional operand data tiles 740 may be retrieved to be included with the dense matrix result tile 730 in thread packets generated by operand packing 750. The thread packets may each correspond to generation of an output sub-tile 775, e.g., by generating 4×4 data tiles with corresponding operands for processing by the SISD instructions 765. When thread packets are ready in the thread packet cache 760, the scalar computing core may generate processing threads with register data from the thread packet and execute associated instructions 765 in the processing thread 770. In some circumstances, the instructions may also provide for data copying of register data for use by other processing threads 770. In this example, processing thread 770A, 770B copies data from a thread packet awaiting execution (or further execution) in the thread packet cache 760. In this example, the data copied by processing thread 770A from the thread packet may later be used in processing by processing thread 770B. This copy instruction permits data dependencies across threads to be resolved within the scalar computing core itself, without requiring additional data retrieval in an operand data tile 740 or writing partial data to memory in some embodiments. As such, dense compute results or other operands packaged in one thread packet may be copied and used by additional processing threads in a thread family). As a result, the tightly-coupled relationship between the dense computations and scalar computations for data tiles enables fast and efficient execution of complex matrix operations.

Tile Sequencing

The overall efficiency of matrix processor while executing an equation depends on how optimally the matrix equations are tiled and allocated for execution, the inherent operand dependencies, and the memory bandwidth available. In one embodiment, the matrix processor in one embodiment uses 8×8 output matrix tiling granularity across the natively supported matrix equations and APIs. That is, the matrix processor may provide data tiling and processing of various matrix algorithms for an 8×8 output matrix (and corresponding input matrix sizes). Various example algorithms are shown below for performing such data tiling and processing for different matrix processing equations and provide additional use cases for the embodiments of a matrix processing engine discussed herein. In additional examples, the data tiling and processing instructions may be provided by the host system for the matrix processing engine to execute. In these examples, matrix tiling may be determined by a component of the host processing system or another device.

In an embodiment with an 8×8 output, tiling for dense compute blocks follows special walking patterns for balancing available compute and memory bandwidth and produces an output tile of size 1×8 as discussed with respect to FIG. 3. The dense compute path in this example produces bursts of 1×8 size of output tiles for 8 consecutive clocks, resulting in an 8×8 size accumulated dense compute result tile. As also shown in FIG. 3, the SISD scalar operands R[N] that combine with a dense compute result matrix is also generated for a tile size of 1×8 over consecutive 8 clocks, resulting in 8×8 size of output for subsequent processing. The operand packing circuit can further group two 8×8 tile blocks into 4 sub-blocks of 4×4 tile size to align with the thread register space and microcode's tiling format. There can be scenarios where operands are read from the resultant matrix of the earlier tiles during execution, creating dependencies on operand gathering. Since both the dense and scalar compute follow the tile-based execution, sequencing logic selects and optimizes tile walking patterns to reduce such runtime operand dependencies, and the logic may include use of the copy instructions to permit cross-thread data re-use within the scalar computing core without additional memory read/ writes.

The following section explains how the tiling ordering is designed for the diverse matrix equations.

These example cases of various complexities can be used to map similar matrix algebra of different functions, exploiting the advantage of unified dense and programmable scalar compute capability.

SGEMM,GEMV,SDDMM

Figure 8:
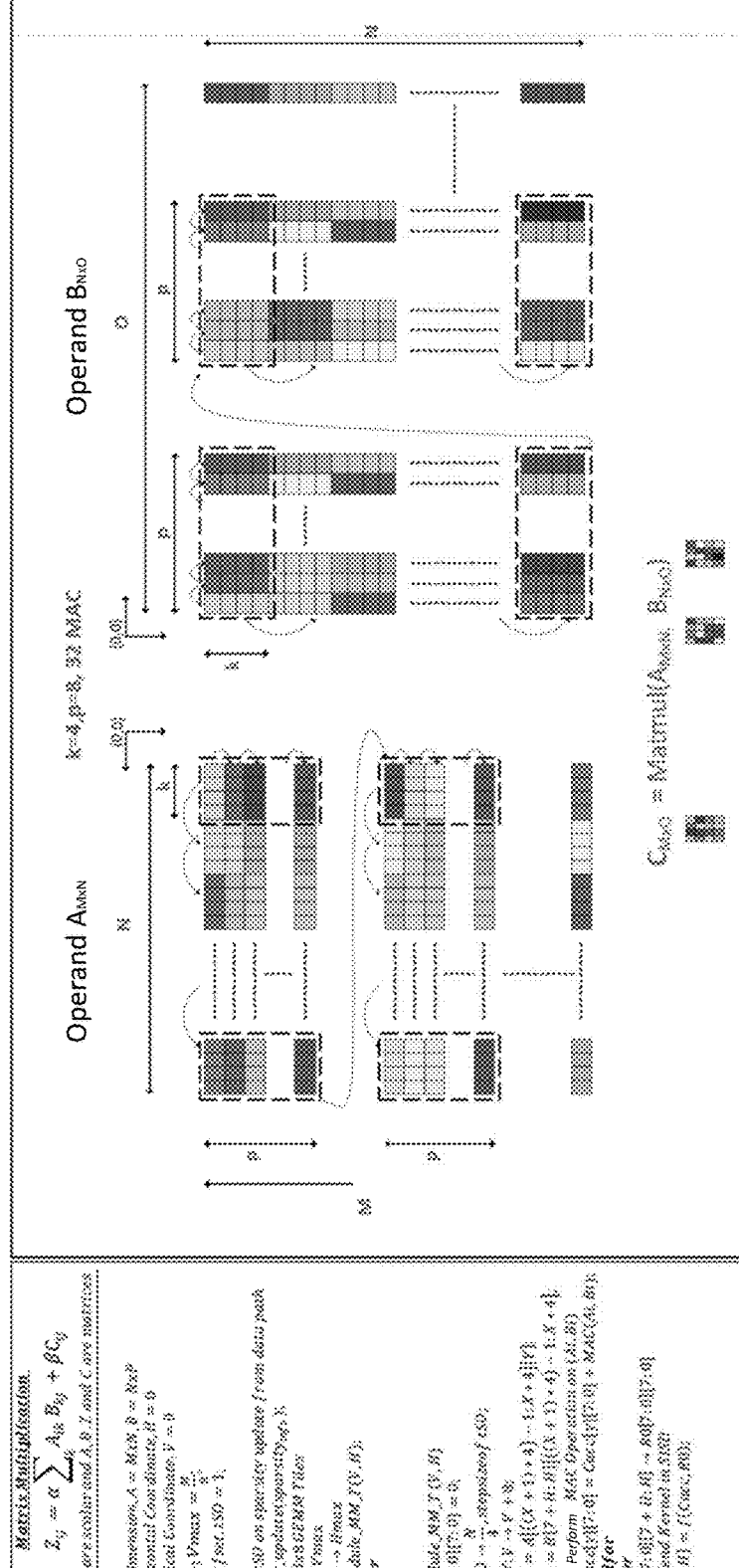
FIG. 8 shows an implementation of a Tiling Algorithm of Matrix-Matrix Multiplication (SGEMM), according to one embodiment.

FIG. 8 shows an implementation of a Tiling Algorithm of Matrix-Matrix Multiplication (SGEMM), according to one embodiment.

Matrix-Matrix multiplication (SGEMM) involves multiplication of two dense matrices to produce an output matrix, after performing per element blending operations. SGEMM is a fundamental building block of many algorithms.

In case of a SGEMM operation, input operands (e.g., A and B matrices) are available without dependencies on resultant matrix. Therefore, tiles can be selected naively and outputs may be calculated horizontal row first, followed by vertical flow. Tiling algorithm of GEMM is detailed in FIG. 8. In one embodiment, computations are divided into 8×8 blocks and in each iteration, 1×K(K=4) elements of A operands are broadcast to P(P=8) number of independent channels of SIMD compute, where K×P size of B operands are wired to operate with the A operands. While A is moving vertically(Row wise) for P consecutive clock cycles, B operands values are reused for calculating a P×P tile of partial results (e.g., the 8×8 dense compute result tile). The same iterative execution is called by the P×P tiling logic to complete an entire output matrix dimension of matrix equations. Tile offset (tileStepOffset, tSO) is set to one in case of dense multiplication where all blocks are considered for computation and accumulation steps are advanced in terms of K (K=4).

As another matrix equation, Matrix-vector multiplication (GEMV) involves multiplication of a matrix with a vector producing a vector result. GEMV uses same Tiling Algorithm of SGEMM as in FIG. 4, where the dimension of A is configured as 1×N, which results in output result matrix dimension of 1×8, for blend operations if any. GEMV may be a memory bound operation and the Memory Arbiter of the Matrix processor may use all the available ports (in one embodiment, 4×16 B) for fetching the operand data and streams operands for compute efficiency.

As another algorithm, SDDMM kernels compute a filtered Matrix-Matrix product and performs element-wise multiplications between matrix C and the results of a matrix multiplication between A and B. SDDMM uses the same Tiling Algorithm of SGEMM as shown in FIG. 8, and R[N] operands are used for the matrix C element-wise multiplication in microcode on the scalar computing core as applied to the accumulated result from the SIMD path multiplying matrix A and B.

Figure 9:
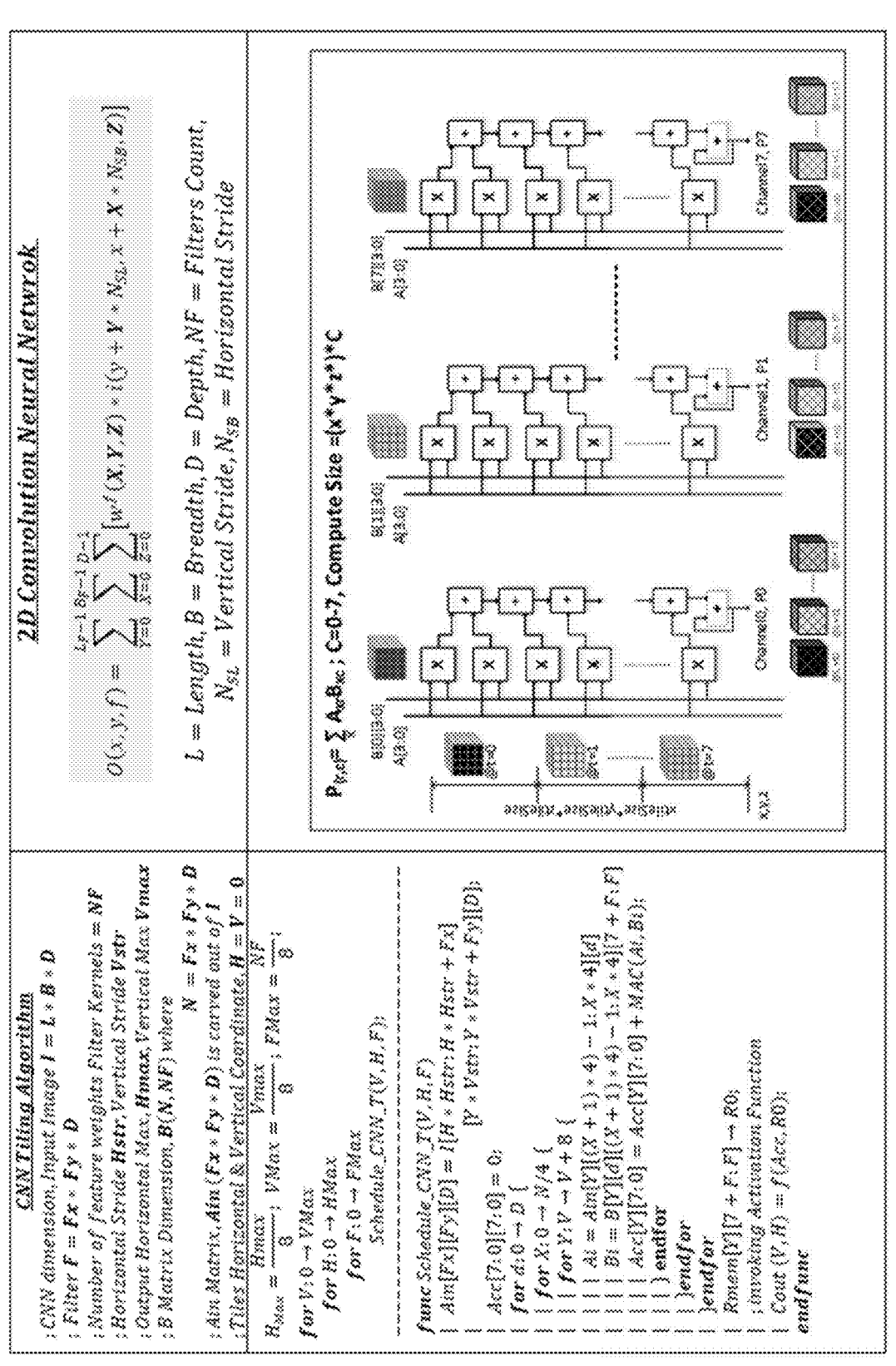
FIG. 9 shows an example tiling of a convolution algorithm according to one embodiment.

FIG. 9 shows an example tiling of a convolution algorithm according to one embodiment. Convolutional Neural Networks (CNNs) are an increasing important operation in emerging applications deployed on modern edge systems. CNNs are computed using dense kernels that differ from traditional dense linear algebra routines and may apply the same convolutional kernel(s) across individual portions of a matrix. In the case of a convolution operation, the input operands are tiled, and the output is calculated based on a scan line order, and result matrix tiles are calculated on horizontal row first followed by vertical flow, as illustrated in FIG. 9. In this example, the activation layer is mapped to the A operand port of Matrix processor, and the B operand port is connected to the feature weights. This way, filter weights are convoluted with activation layers, on each channel of the SIMD compute paths and in parallel. Activation functions such as ReLU and SoftMax are enabled through the scalar computing core executing SISD micro kernel instructions with the native instruction set. The convolution operation can gather operand data by traversing the Length, Breadth and Depth dimensions of the operands. In embodiments, the matrix processing engine 100 performs better with dense operands on inner direction of the accumulation loop as the operands in inner loop stored in columns of the operand memory, resulting in potential alignment issues with compute size and memory data access width, based on filter dimensions. Hence, dense operands with higher dimension value may be inner dimension of the memory layout, to maximize compute utilization. The matrix computing engine supports A and B operand memory layouts using any of the following three formats: 1) (Depth, Length, Breadth), 2) (Breadth, Length, Depth) or 3) (Length, Breadth, Depth). Tiling logic and operand gather logic can traverse on any of the above formats (picked optimally) to gather operands while performing convolutions. Activation functions are supported through a SISD kernel to operate on correlation results from the vector engine of matrix processor.

FIG. 10 shows an example tiling algorithm of Cholesky decomposition, according to one embodiment.

The Cholesky decomposition of A is a decomposition of the form A=LLT, where L is a lower triangular matrix and LT denotes the conjugate transpose of L. Consecutive rows in this algebraic operation are calculated using the previous rows and column of output matrix L, creating a serialized operand gather dependency during execution. A diagonal tile walking order is selected for compute efficiency due to dependency on the top row and left column of the output matrix. The compute requirement increases as execution progresses from left to right; hence, the most compute-intensive tile is the rightmost tile on the diagonal. In this example, the tile walking algorithm selects the leftmost tile first, followed by the rightmost tile before scheduling the remaining tiles, starting from the left tile until the last tile on the diagonal line as shown in FIG. 10. This tile walking order ensures that sequentially connected dense and scalar compute blocks are filled with their workloads efficiently while reducing operand dependency. FIG. 10 also shows mapping of the triangular region of the Cholesky equation on to the scalar computing core as an extended function. Similarly, other regions of the Cholesky equations are written using natively supported instruction sets enabling a complete mapping.

As another operation, a Matrix Solve operation solves for X in AX=LLT X=Y Where L is an invertible triangular matrix, LT is its transpose, and Y is the other input matrix. Matrix solve has a dependency on previous row's X solution for solving consecutive rows. Compute requirement increases in equal proportion as the Solve execution progresses along rows. Therefore, the Tile walking algorithm schedules all the tiles in the same row in sequential order before it moves vertically, for calculating consecutive rows. Like other matrix operations such as decomposition, GEMM and CNN, for Matrix Solve the Tiling logic divides operands for the dense MAC operation on to the vector engine and the rest of the execution to the scalar core for running microcode.

Evaluation Results

FIG. 11 shows a relative speedup achieved by one embodiment of the matrix processor relative to other computing circuits. In this example, an embodiment of the matrix processing engine using 8×8 output tiles and 4×4 data tiles for thread packing (and outputting 4×4 sub-tiles) is compared.

The MxCore embodiment was compared against other baseline architectures: CPU, GPU, and ASIC. For ASIC based architecture baseline, the "Eyeriss" processor was used for Dense DNNs, and Intel's VIO accelerators for EKF acceleration that include Cholesky decomposition and Tri-angular Matrix Solve.

CPU: The CPU selected is a Jetson Nano-4GB Board with a quad-core A-57 ARM CPU. For dynamic power measurement on the Jetson Nano-4GB board, jetson_stats tools were used. To run the benchmarks on the CPU, the ARM Compute Library for the dense computations and the Eigen-3.3.9 library for processing the CNNs, Cholesky decomposition, and the Triangular Matrix Solve.

GPU: The 128-core Maxwell GPU on the Jetson Nano-4GB Board with CUDA 10. The cuDNN library in the Jet-Pack SDK is used to process the dense and CNNs, respectively. For the GEMM, Cholesky, and Solve benchmarks, the cuBLAS library was used. For the power measurement, the jetson_stats tool was used.

Accelerators: For the dense Alex-Net and VGG-16, along with the CPU and GPU the results were also compared against the Eyeriss CNN accelerator. An 8-bit version of the Eyeriss accelerator was used for the comparative assessment. For energy comparison, the nn_dataflow publicly available simulator was used. For the Cholesky and Solve benchmarks, the MxCore was compared against the VIO accelerator.

DataSets—The MxCore configuration was evaluated for dense workloads. The dense computations include General Matrix Multiply (GEMMM) dense version of Alex-Net and VGG-16 CNNs, dense linear algebra routines, namely Cholesky and matrix solve benchmarks. For the GEMM, matrix sizes were used from the DeepBench framework.

FIG. 11 shows relative energy savings achieved by MxCore, GPU, Eyeriss and VIO over the CPU.

Power and Area Scaling:—Since the selected baseline architectures were presented on different process technology nodes, the power and area numbers with respect to MxCore were scaled (7 nm).

One embodiment of the matrix processor, termed MxCore, a unified programmable matrix processor for matrix algebra and DNNs, is compared for performance, area, and energy against custom accelerator as well as generic processor as shown in FIGS. 11-12. For the GEMM workload, MxCore is 3.47× times faster than the GPU. For the dense convolution workload MxCore is 4.2× times faster than Eyeriss and 1.2× times faster than the GPU. As evident from the charts, MxCore outperforms almost all the baseline architectures in these three metrics by a factor of 2× to 14× and achieves performance per unit area on par or better than ASIC solutions, while providing the flexible programmability to support variety of compute primitives due its unique way of binding the fundamental building blocks. MxCore also provides significant power savings at iso-technology across solutions.

Finally, FIG. 13 shows example physical synthesis of the MxCore embodiment.

Example Devices

Figure 14:
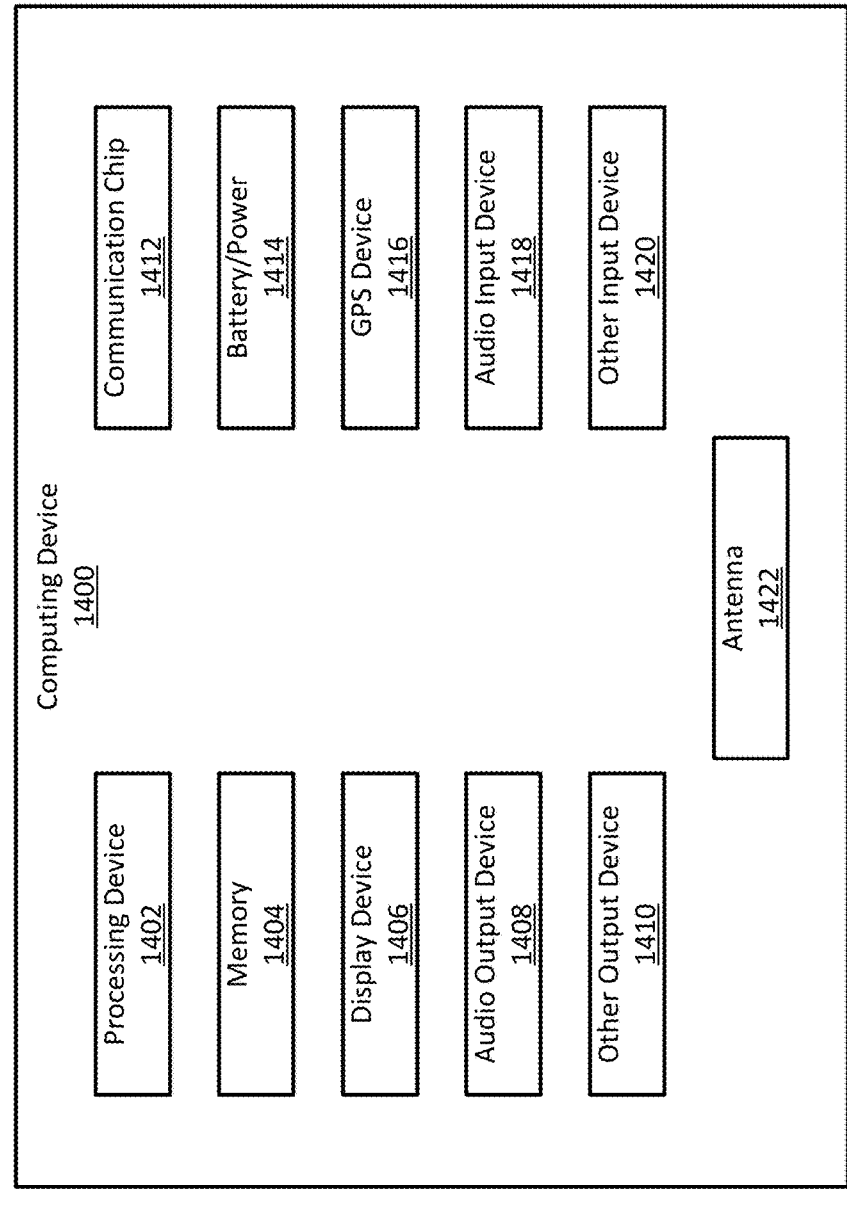
FIG. 14 is a block diagram of an example computing device that may include one or more components in accordance with any of the embodiments disclosed herein.

FIG. 14 is a block diagram of an example computing device 1400 that may include one or more components with a matrix processing engine in accordance with any of the embodiments disclosed herein. For example, any suitable ones of the components of the computing device 1400 may include a hardware component (e.g., a processor) configured to execute instructions in conjunction with a matrix processing engine 100 and operate as a host system as described herein.

A number of components are illustrated in FIG. 14 as included in the computing device 1400, but any one or more of these components may be omitted or duplicated, as suitable for the application. In some embodiments, some or all of the components included in the computing device 1400 may be attached to one or more motherboards. In some embodiments, some or all of these components are fabricated onto a single system-on-a-chip (SoC) die.

Additionally, in various embodiments, the computing device 1400 may not include one or more of the components illustrated in FIG. 14, but the computing device 1400 may include interface circuitry for coupling to the one or more components. For example, the computing device 1400 may not include a display device 1406, but may include display device interface circuitry (e.g., a connector and driver circuitry) to which a display device 1406 may be coupled. In another set of examples, the computing device 1400 may not include an audio input device 1424 or an audio output device 1408 but may include audio input or output device interface circuitry (e.g., connectors and supporting circuitry) to which an audio input device 1424 or audio output device 1408 may be coupled.

The computing device 1400 may include a processing device 1402 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing device 1400 may include a memory 1404, which may itself include one or more memory devices such as volatile memory (e.g., dynamic random-access memory (DRAM)), nonvolatile memory (e.g., read-only memory (ROM)), flash memory, solid state memory, and/or a hard drive. The memory 1104 may include instructions executable by the processing device for performing methods and functions as discussed herein. Such instructions may be instantiated in various types of memory, which may include non-volatile memory and as stored on one or more non-transitory mediums. In some embodiments, the memory 1404 may include memory that shares a die with the processing device 1402. This memory may be used as cache memory and may include embedded dynamic random-access memory (eDRAM) or spin transfer torque magnetic random-access memory (STT-MRAM).

In some embodiments, the computing device 1400 may include a communication chip 1412 (e.g., one or more communication chips). For example, the communication chip 1412 may be configured for managing wireless communications for the transfer of data to and from the computing device 1400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1412 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1412 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 1412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1412 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1412 may operate in accordance with other wireless protocols in other embodiments. The computing device 1400 may include an antenna 1422 to facilitate wireless communications and/or to receive other wireless communications (such as AM or FM radio transmissions).

In some embodiments, the communication chip 1412 may manage wired communications, such as electrical, optical, or any other suitable communication protocols (e.g., the Ethernet). As noted above, the communication chip 1412 may include multiple communication chips. For instance, a first communication chip 1412 may be dedicated to shorter-range wireless communications such as Wi-Fi or Bluetooth, and a second communication chip 1412 may be dedicated to longer-range wireless communications such as global positioning system (GPS), EDGE, GPRS, CDMA, WiMAX, LTE, EV-DO, or others. In some embodiments, a first communication chip 1412 may be dedicated to wireless communications, and a second communication chip 1412 may be dedicated to wired communications.

The computing device 1400 may include battery/power circuitry 1414. The battery/power circuitry 1414 may include one or more energy storage devices (e.g., batteries or capacitors) and/or circuitry for coupling components of the computing device 1400 to an energy source separate from the computing device 1400 (e.g., AC line power).

The computing device 1400 may include a display device 1406 (or corresponding interface circuitry, as discussed above). The display device 1406 may include any visual indicators, such as a heads-up display, a computer monitor, a projector, a touchscreen display, a liquid crystal display (LCD), a light-emitting diode display, or a flat panel display, for example.

The computing device 1400 may include an audio output device 1408 (or corresponding interface circuitry, as discussed above). The audio output device 1408 may include any device that generates an audible indicator, such as speakers, headsets, or earbuds, for example.

The computing device 1400 may include an audio input device 1424 (or corresponding interface circuitry, as discussed above). The audio input device 1424 may include any device that generates a signal representative of a sound, such as microphones, microphone arrays, or digital instruments (e.g., instruments having a musical instrument digital interface (MIDI) output).

The computing device 1400 may include a GPS device 1418 (or corresponding interface circuitry, as discussed above). The GPS device 1418 may be in communication with a satellite-based system and may receive a location of the computing device 1400, as known in the art.

The computing device 1400 may include an other output device 1410 (or corresponding interface circuitry, as discussed above). Examples of the other output device 1410 may include an audio codec, a video codec, a printer, a wired or wireless transmitter for providing information to other devices, or an additional storage device.

The computing device 1400 may include an other input device 1420 (or corresponding interface circuitry, as discussed above). Examples of the other input device 1420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1400 may have any desired form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, the computing device 1400 may be any other electronic device that processes data.

Select Examples

The following paragraphs provide various examples of the embodiments disclosed herein.

Example 1 provides for a computing device including: a dense matrix compute circuit configured to receive a first dense operand and a second dense operand and perform an operation on the first dense operand and the second dense operand to generate a dense compute result; an operand packing circuit configured to receive the dense compute result and generate a set of thread packets based on the dense compute result; and a scalar computing core configured to receive the set of thread packets and execute a corresponding set of processing threads, the computing core executing a processing thread by loading the associated thread packet to a set of registers and executing a set of configurable instructions with respect to the set of registers to generate one or more outputs.

Example 2 provides for the computing device of example 1, wherein the operation performed by the dense matrix compute circuit is not configurable.

Example 3 provides for the computing device of example 1 or 2, wherein the operation performed by the dense matrix compute circuit is a multiply-and-accumulate.

Example 4 provides for the computing device of any of examples 1-3, wherein the dense compute result is not stored to a memory.

Example 5 provides for the computing device of any of examples 1-4, wherein the dense compute result comprises a plurality of dense compute channel outputs.

Example 6 provides for the computing device of example 5, wherein the plurality of dense compute channel outputs are accumulated with other dense compute channel outputs from the dense matrix compute to generate a dense compute result tile.

Example 7 provides for the computing device of example 6, wherein the generated set of one or more thread packets is based on the dense compute result tile; and the operand packing circuit generates the set of thread packets based on the dense compute result tile.

Example 8 provides for the computing device of example 6, wherein the other dense compute channel outputs are generated by the dense matrix compute circuit over a plurality of clock cycles and accumulated over the plurality of clock cycles.

Example 9 provides for the computing device of example 8, wherein the first dense operand or the second dense operand received by the dense matrix compute circuit are selected from different portions of an input data tile during the plurality of clock cycles to generate the other dense compute channel outputs.

Example 10 provides for the computing device of any of examples 1-9, wherein the operand packing circuit is configurable to generate thread packets having different tile sizes.

Example 11 provides for the computing device of any of examples 1-10, wherein the set of configurable instructions include an operation for transferring data to an active processing thread from a thread packet to be executed by another processing thread.

Example 12 provides for the computing device of any of examples 1-11, further comprising a data tiling and sequencing circuit configured to determine data tiles and sequence the data tiles for operations by the dense matrix compute circuit, operand packing circuit, and scalar computing core.

Example 13 provides for the computing device of any of examples 1-12, wherein the scalar computing core executes instructions for a plurality of processing threads simultaneously.

Example 14 provides for the computing device of any of examples 1-13, wherein the operand packing circuit retrieves another operand data tile from a memory and combines the other operand data tile with the dense compute result to generate the set of one or more thread packets.

Example 15 provides for the computing device of any of examples 1-14, wherein the computing device is a co-processor of another processing device.

Example 16 provides for a method for generating a set of output tiles with a dense matrix compute circuit coupled to a scalar computing core, the method including: identifying a set of output tiles to be calculated by application of instructions by the scalar computing core to a respective set of dense compute result tiles generated by the dense matrix compute circuit; for each dense compute result tile in the set of dense compute result tiles: retrieving a first dense operand and a second dense operand for the dense compute result tile; providing a first dense operand and a second dense operand associated with calculating the dense compute result tile to the dense matrix compute circuit that performs an operation on the first dense operand and the second dense operand; determining the dense compute result tile at least in part from a dense compute result from the dense matrix compute circuit; generating a set of thread packets based on the dense compute result tile; and providing the set of thread packets to the scalar compute core for execution in a set of processing threads of a set of instructions associated with the set of thread packets to generate one or more output tiles of the set of output tiles.

Example 17 provides for the method of example 16, wherein the operation performed by the dense matrix compute circuit is not configurable.

Example 18 provides for the method of example 16 or 17, wherein the operation performed by the dense matrix compute circuit is a multiply-and-accumulate.

Example 19 provides for the method of any of examples 16-18, wherein the dense compute result is not stored to a memory.

Example 20 provides for the method of any of examples 16-19, wherein the dense compute result comprises a plurality of dense compute channel outputs.

Example 21 provides for the method of any of examples 16-20, wherein the dense compute result tile is determined by accumulating a plurality of dense compute results.

Example 22 provides for the method of example 21, wherein the plurality of dense compute results are generated by the dense matrix compute circuit over a plurality of clock cycles and accumulated over the plurality of clock cycles.

Example 23 provides for the method of example 22, wherein the first dense operand or the second dense operand received by the dense matrix compute circuit are selected from different portions of an input data tile during the plurality of clock cycles to generate the plurality of dense compute results.

Example 24 provides for the method of any of examples 16-23, wherein set of thread packets have a tile size based on a size of the one or more output tiles.

Example 25 provides for the method of any of examples 16-24, wherein the set of instructions include an operation for transferring data to an active processing thread from a thread packet to be executed by another processing thread.

Example 26 provides for the method of any of examples 16-25, further comprising sequencing the set of output tiles.

Example 27 provides for the method of any of examples 16-26, wherein the scalar computing core executes instructions for a plurality of processing threads simultaneously.

Example 28 provides for the method of any of examples 16-27, wherein generating the set of thread packets includes retrieving another operand data tile from a memory and combining the other operand data tile with the dense compute result tile.

Example 29 provides for the method of any of examples 16-28, wherein the method is performed by a co-processor of another processing device.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

What is claimed is:

1. A computing device, comprising:
a dense matrix compute circuit configured to receive a first dense operand and a second dense operand and perform an operation on the first dense operand and the second dense operand to generate a plurality of dense compute output tiles, each of the plurality of dense compute output tiles having a first tile size;
an operand packing circuit configured to:
receive the plurality of dense compute output tiles,
generate a plurality of additional tiles from data in a memory based on the first tile size, and
generate a plurality of thread packets from the plurality of dense compute output tiles and the plurality of additional tiles, a thread packet having a second tile size that is different from the first tile size; and
a scalar computing core configured to perform scalar operations on the plurality of thread packets through a plurality of processing threads of the scalar computing core to generate one or more output tiles.

2. The computing device of claim 1, wherein the operation performed by the dense matrix compute circuit comprises one or more multiply-and-accumulate operations.

3. The computing device of claim 1, wherein the dense matrix compute circuit is configured to generate the plurality of dense compute output tiles by generating a dense compute result that comprises a plurality of dense compute channel outputs.

4. The computing device of claim 3, wherein the plurality of dense compute channel outputs are accumulated with other dense compute channel outputs from the dense matrix compute circuit to generate the plurality of dense compute output tiles.

5. The computing device of claim 4, wherein the other dense compute channel outputs are generated by the dense matrix compute circuit over a plurality of clock cycles and accumulated over the plurality of clock cycles.

6. The computing device of claim 1, wherein the plurality of thread packets have different tile sizes.

7. The computing device of claim 1, wherein the plurality of processing threads comprise an active processing thread and a queue processing thread, wherein the scalar computing core is configured to perform a scalar operation by transferring data in a thread packet from a register space of the queue processing thread to the active processing thread.

8. The computing device of claim 1, wherein the operand packing circuit is to generate the plurality of thread packets by combining the plurality of dense compute output tiles and the plurality of additional tiles.

9. The computing device of claim 1, wherein the second tile size is smaller than the first tile size.

10. The computing device of claim 1, wherein the second tile size is determined based on a size of the one or more output tiles.

11. The computing device of claim 1, wherein the plurality of processing threads comprises one or more parent threads and one or more child threads, wherein the scalar computing core is configured to run the one or more child threads after the one or more parent threads.

12. The computing device of claim 1, wherein the scalar computing core is configured to run the plurality of processing threads in parallel.

13. A method for executing a neural network, the method comprising:

providing one or more first dense operands and one or more second dense operands in the neural network to a dense matrix compute circuit;

performing, by the dense matrix compute circuit, an operation on the one or more first dense operands and one or more second dense operands to generate a plurality of dense compute output tiles, each of the plurality of dense compute output tiles having a first tile size;

generate a plurality of additional tiles from data in a memory based on the first tile size;

generating a plurality of thread packets based on the plurality of dense compute tiles and the plurality of additional tiles, each of the plurality of thread packets having a second tile size that is different from the first tile size; and performing, by a scalar computing core, scalar operations on the plurality of thread packets through a plurality of processing threads to generate one or more output tiles of a layer of the neural network.

14. The method of claim 13, wherein the operation performed by the dense matrix compute circuit comprises one or more multiply-and-accumulate operations.

15. The method of claim 13, wherein the dense matrix compute circuit is configured to generate the plurality of dense compute output tiles by generating a dense compute result that comprises a plurality of dense compute channel outputs.

16. The method of claim 15, wherein the plurality of dense compute output tiles are determined by accumulating the plurality of dense compute channel outputs with other dense compute channel outputs.

17. The method of claim 16, wherein the other dense compute channel outputs are generated by the dense matrix compute circuit over a plurality of clock cycles and accumulated over the plurality of clock cycles.

18. The method of claim 17, wherein the one or more first dense operands or the one or more second dense operands are selected from different portions of an input data tile during the plurality of clock cycles.

19. The method of claim 13, wherein the second tile size is determined based on a size of the one or more output tiles.

20. The method of claim 13, wherein the plurality of processing threads comprise an active processing thread and a queue processing thread, wherein the scalar computing core is configured to perform a scalar operation by transferring data in a thread packet from a register space of the queue processing thread to the active processing thread.

21. The method of claim 13, further comprising sequencing the plurality of output tiles.

22. The method of claim 13, wherein the scalar computing core executes instructions for the plurality of processing threads simultaneously.

23. The method of claim 13, wherein generating the plurality of thread packets includes combining the plurality of dense compute output tiles with the plurality of additional tiles.

24. The method of claim 13, wherein the second tile size is smaller than the first tile size.

25. The method of claim 13, wherein the plurality of processing threads comprises one or more parent threads and one or more child threads, wherein the scalar computing core is configured to run the one or more child threads after the one or more parent threads.

* * * * *